US012608155B2

(12) United States Patent
Chang et al.

(10) Patent No.: US 12,608,155 B2
(45) Date of Patent: Apr. 21, 2026

(54) METHOD AND DEVICE FOR DATA ACCESS, ELECTRONIC APPARATUS AND STORAGE MEDIUM

(71) Applicant: SAMSUNG ELECTRONICS CO., LTD., Suwon-si (KR)

(72) Inventors: Cunbao Chang, XiAn (CN); Wenbin Cao, XiAn (CN); Sha Shi, XiAn (CN); Lijuan Xue, XiAn (CN); Kunpeng Sun, XiAn (CN); Ningning Zhu, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/612,543

(22) Filed: Mar. 21, 2024

(65) Prior Publication Data

US 2025/0036302 A1      Jan. 30, 2025

(30) Foreign Application Priority Data

Jul. 25, 2023    (CN) .......................... 202310920952.4

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | |
|---|---|---|---|
| 10,289,722 B2 | 5/2019 | Choi et al. | |
| 2022/0137865 A1* | 5/2022 | Lee ....................... | G06F 3/0655 |
| | | | 711/154 |

(Continued)

FOREIGN PATENT DOCUMENTS

| | | |
|---|---|---|
| CN | 111737297 A | 10/2020 |
| CN | 113434285 A | 9/2021 |

(Continued)

OTHER PUBLICATIONS

M. Seo, J. Hyun, S. Jeong, X. T. Nguyen, H.-J. Lee and H. Lee, "OASIS: Outlier-Aware KV Cache Clustering for Scaling LLM Inference in CXL Memory Systems," in IEEE Computer Architecture Letters, vol. 24, No. 1, pp. 165-168, Jan.-Jun. 2025, doi: 10.1109/LCA.2025.3567844. (Year: 2025).*
K. Lee et al., "Improving Key-Value Cache Performance With Heterogeneous Memory Tiering: A Case Study of Compute-Express-Link-Based Memory Expansion," in IEEE Micro, vol. 45, No. 2, pp. 102-113, Mar.-Apr. 2025, doi: 10.1109/MM.2024.3358861. (Year: 2025).*

(Continued)

*Primary Examiner* — Daniel C. Chappell
(74) *Attorney, Agent, or Firm* — Sughrue Mion, PLLC

(57) ABSTRACT

A method and device for data access, electronic apparatus and storage medium are provided. The method for data access includes: writing a key of a first key-value pair to a host memory in response to a write request to write the first key-value pair to the memory database; determining whether to write a value of the first key-value pair to the host memory or a Computing Express Link (CXL) memory based on a length of the value of the first key-value pair; and writing the value of the first key-value pair to the host memory or the CXL memory, based on a result of the determination.

20 Claims, 22 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 2022/0224776 A1* | 7/2022 | Doshi | ................. | G06F 12/0897 |
| 2023/0049602 A1* | 2/2023 | Ki | .......................... | G06F 3/0673 |
| 2023/0102067 A1* | 3/2023 | Richardson | ........... | G06F 3/0629 |
| | | | | 711/105 |

FOREIGN PATENT DOCUMENTS

| | | |
|---|---|---|
| CN | 114115699 A | 3/2022 |
| CN | 114153760 A | 3/2022 |

OTHER PUBLICATIONS

A. Aboytes and P. Mehra, "Improving Performance on Tiered Memory With Semantic Data Placement," in IEEE Computer Architecture Letters, vol. 24, No. 2, pp. 297-300, Jul.-Dec. 2025, doi: 10.1109/LCA.2025.3611326. (Year: 2025).*

Kyungsan Kim et al., "SMT: Software-Defined Memory Tiering for Heterogeneous Computing Systems With CXL Memory Expander", Theme Article: Emerging System Interconnects, IEEE Micro, vol. 43, No. 2, pp. 20-29, Jan. 31, 2023, doi: 10.1109/MM.2023. 3240774.

* cited by examiner

FIG. 3

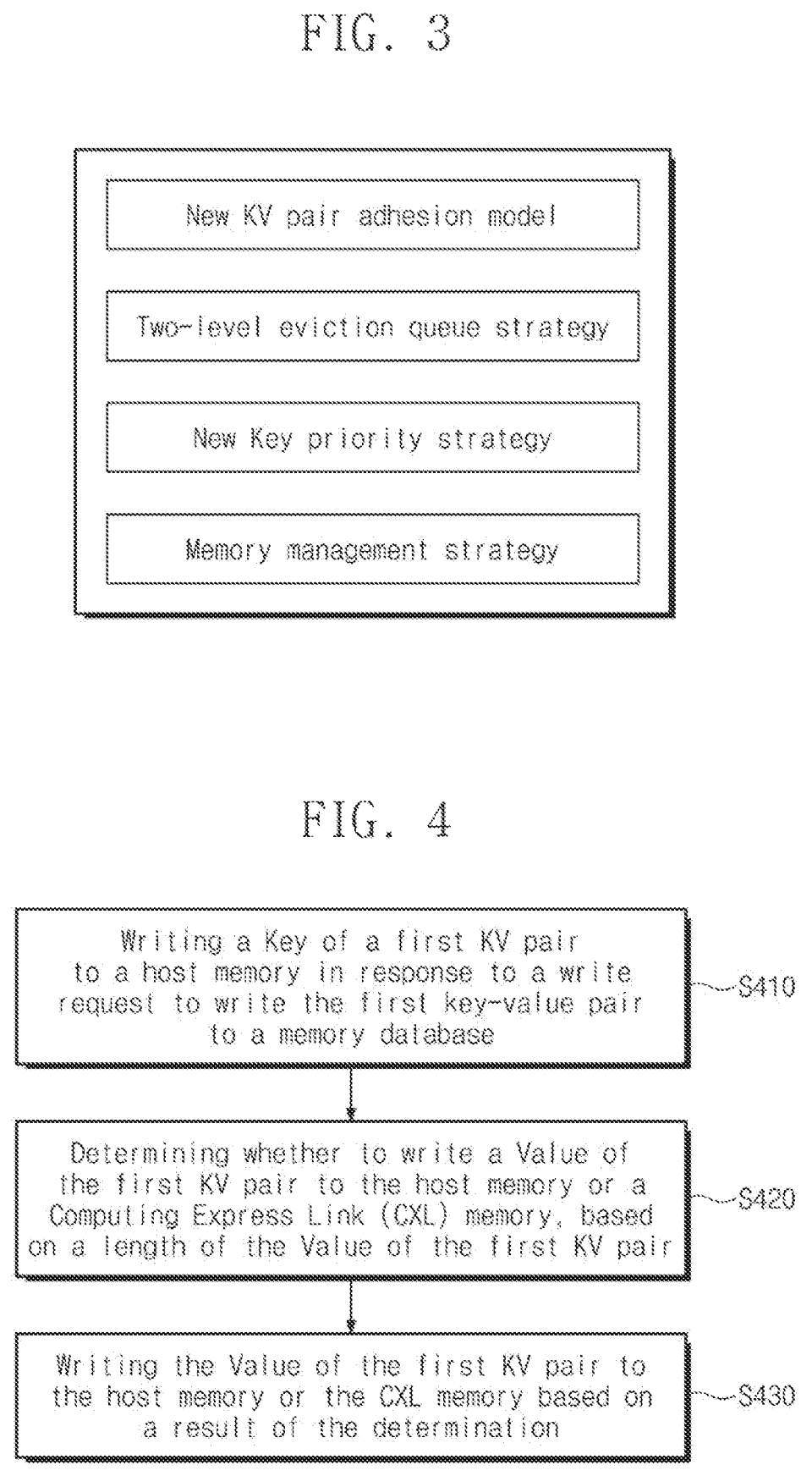

New KV pair adhesion model

Two-level eviction queue strategy

New Key priority strategy

Memory management strategy

FIG. 4

Writing a Key of a first KV pair to a host memory in response to a write request to write the first key-value pair to a memory database — S410

Determining whether to write a Value of the first KV pair to the host memory or a Computing Express Link (CXL) memory, based on a length of the Value of the first KV pair — S420

Writing the Value of the first KV pair to the host memory or the CXL memory based on a result of the determination — S430

FIG. 12

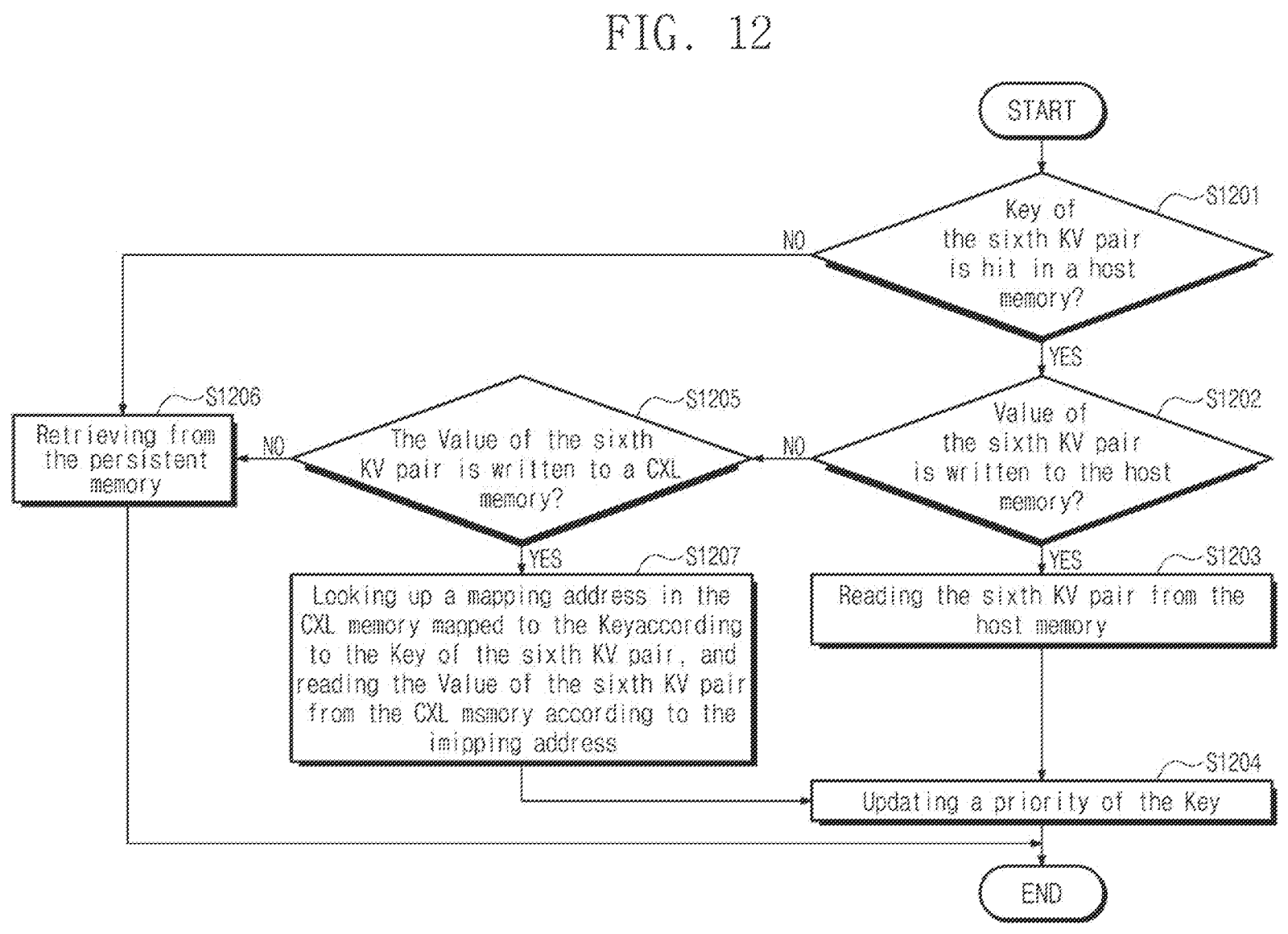

START

S1201

Key of
the sixth KV pair
is hit in a host
memory?

NO → S1206 Retrieving from the persistent memory

YES

S1202

Value of
the sixth KV pair
is written to the host
memory?

NO

S1205

The Value of the sixth
KV pair is written to a CXL
memory?

NO → S1206 Retrieving from the persistent memory

YES

S1207

Looking up a mapping address in the
CXL memory mapped to the Key according
to the Key of the sixth KV pair, and
reading the Value of the sixth KV pair
from the CXL memory according to the
mapping address

YES

S1203

Reading the sixth KV pair from the
host memory

S1204

Updating a priority of the Key

END

——·—→ denoting: evicting KV pair from Host memory

Figure 20:
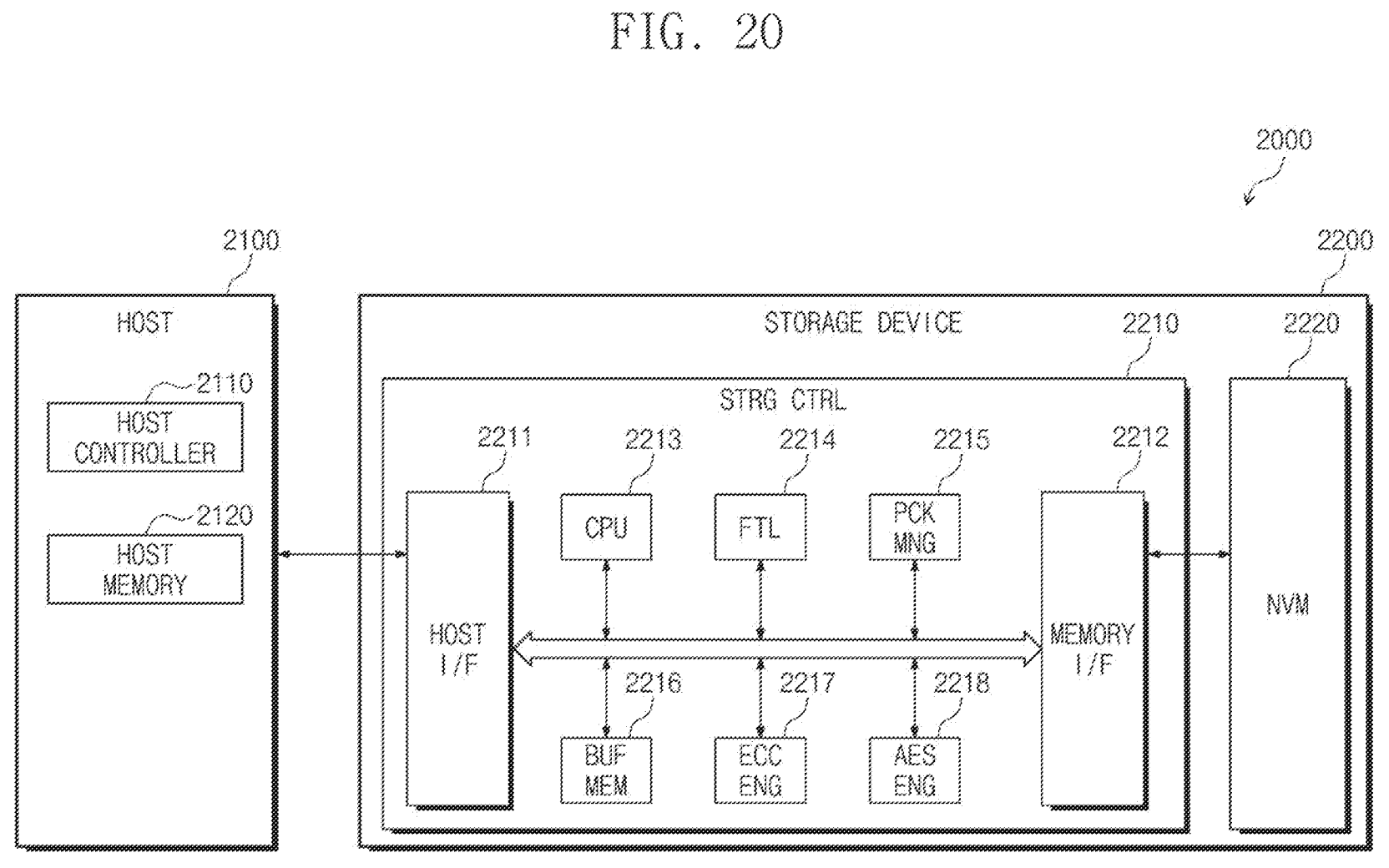

HOST

2110 HOST CONTROLLER

2120 HOST MEMORY

2200

STORAGE DEVICE

2220 NVM

2210 STRG CTRL

2211 HOST I/F

2212 MEMORY I/F

2213 CPU

2214 FTL

2215 PCK MNG

2216 BUF MEM

2217 ECC ENG

2218 AES ENG

METHOD AND DEVICE FOR DATA ACCESS, ELECTRONIC APPARATUS AND STORAGE MEDIUM

CROSS-REFERENCE TO RELATED APPLICATION(S)

This application is based on and claims priority under 35 U.S.C. § 119 to Chinese Patent Application No. 202310920952.4, filed on Jul. 25, 2023, in the Chinese Patent Office, the disclosure of which is incorporated by reference herein in its entirety.

BACKGROUND

The disclosure relates to a field of data security, and in particular, to a method and device for data access, an electronic apparatus and a storage medium.

Redis is a kind of memory database that stores data in a data form of a KV (Key-Value) pair with a data structure of a dictionary.

A memory space of the memory database may be small, under a premise of ensuring an access efficiency of the memory database, and when a large amount of data is written in a continuous period of time, the memory space of the memory database may be insufficient, and its memory usage may reach the an upper limit very easily.

SUMMARY

According to an aspect of one or more embodiments, a method for data access to a memory database, includes: writing a key of a first key-value pair to a host memory in response to a write request to write the first key-value pair to the memory database; determining whether to write a value of the first key-value pair to the host memory or a Computing Express Link (CXL) memory, based on a length of the value of the first key-value pair; and writing the value of the first key-value pair to the host memory or the CXL memory, based on a result of the determination.

According to an aspect of one or more embodiments, a device for data access to a memory database, including: a data writing unit. The data unit is configured to: write a key of a first key-value pair to a host memory in response to a write request to write the first key-value pair to the memory database; determine whether to write a value of the first key-value pair to the host memory or a Computing Express Link (CXL) memory, based on a length of the value of the first key-value pair; and write the value of the first key-value pair to the host memory or the CXL memory based on a result of the determination.

According to an aspect of one or more embodiments, an electronic apparatus includes: at least one processor; and at least one memory storing computer executable instructions, wherein the at least one processor is configured to execute the computer executable instructions to: write a key of a first key-value pair to a host memory, in response to a write request to write the first key-value pair to a memory database; determine whether to write a value of the first key-value pair to the host memory or a Computing Express Link (CXL) memory, based on a length of the value of the first key-value pair; and write the value of the first key-value pair to the host memory or the CXL memory, based on a result of the determination.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a block diagram illustrating a KV pair adhesion model, a two-level eviction queue strategy, a Key priority strategy, and a memory management strategy according to one or more embodiments of the disclosure;

FIG. 4 is a flowchart illustrating a method for data access according to one or more embodiments of the disclosure;

FIG. 12 is a flowchart illustrating a process for reading a Value of a KV pair from a persistent memory or from a host memory or a CXL memory according to one or more embodiments of the disclosure;

FIG. 20 is a block diagram of a host storage system according to one or more embodiments.

DETAILED DESCRIPTION

Some aspects of the embodiments may provide an effective solution to overcome the problem of insufficient memory space in the memory database while efficiently accessing the memory database.

In order to enable those ordinary skilled in the art to better understand the technical solution of the present disclosure, technical solutions in embodiments of the present disclosure will be described clearly and completely in combination with the accompanying drawings.

It should be noted that terms "first", "second", etc. in the specification and claims as well as the above accompanying drawings of the present disclosure are used to distinguish similar objects and need not be used to describe a specific order or sequence. It should be understood that such used data may be interchanged, when appropriate, so that the embodiments of the present disclosure described herein can be implemented in an order other than those illustrated or described herein. The embodiments described in the following embodiments do not represent all embodiments that are consistent with the present disclosure. On the contrary, they are merely examples of devices and methods that are consistent with some aspects of the present disclosure, as detailed in the appended claims.

It should be noted here that "at least one of several items" appearing in the present disclosure all means that there are three kinds of juxtaposition situations: "any one of these items", "combination of any number of these items", and "all of these items". For example, "including at least one of A and B" includes the following three juxtaposition situations: (1) including A; (2) including B; or (3) including A and B. As another example, "performing at least one of steps 1 and 2", that is, means the following three juxtaposition situations: (1) performing step 1; (2) performing step 2; (3) performing steps 1 and 2.

Figure 1:
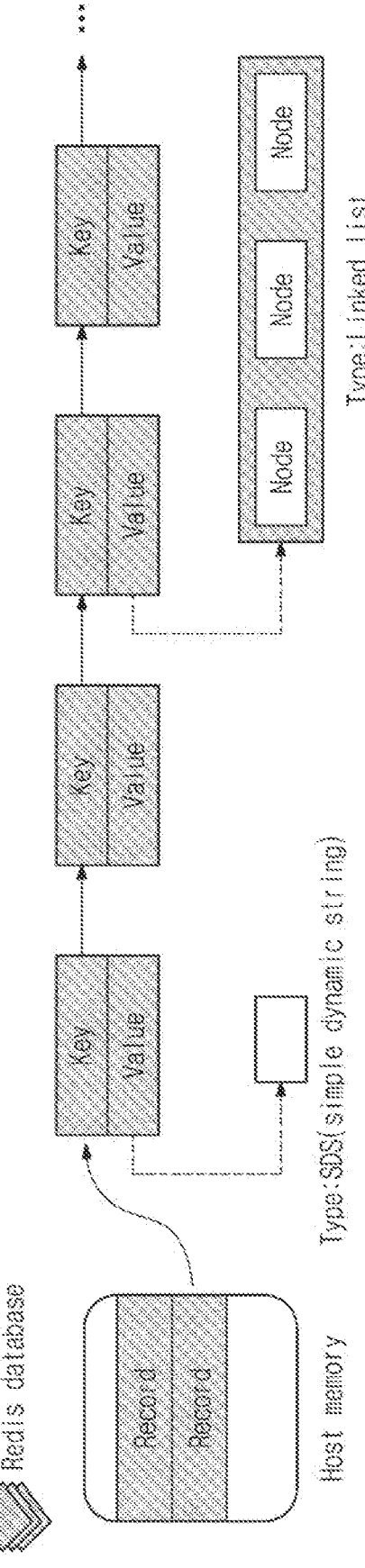
FIG. 1 is a diagram illustrating a data storage model of a Redis database.

A Redis database is firstly taken as an example below to illustrate characteristics of an memory database:

A data storage manner of the Redis database is Key-Value pairs (referred to as KV pairs for short) and stores data according to a data structure type of a dictionary. As shown in FIG. 1, each KV pair stored in the Redis database is aggregated. In addition, a key (Key) in the KV pair is a fixed string type, while a value (Value) in the KV pair may be of multiple types to adapt to complex application scenarios. However, some types of Value may occupy a large amount of memory space.

Figure 2:
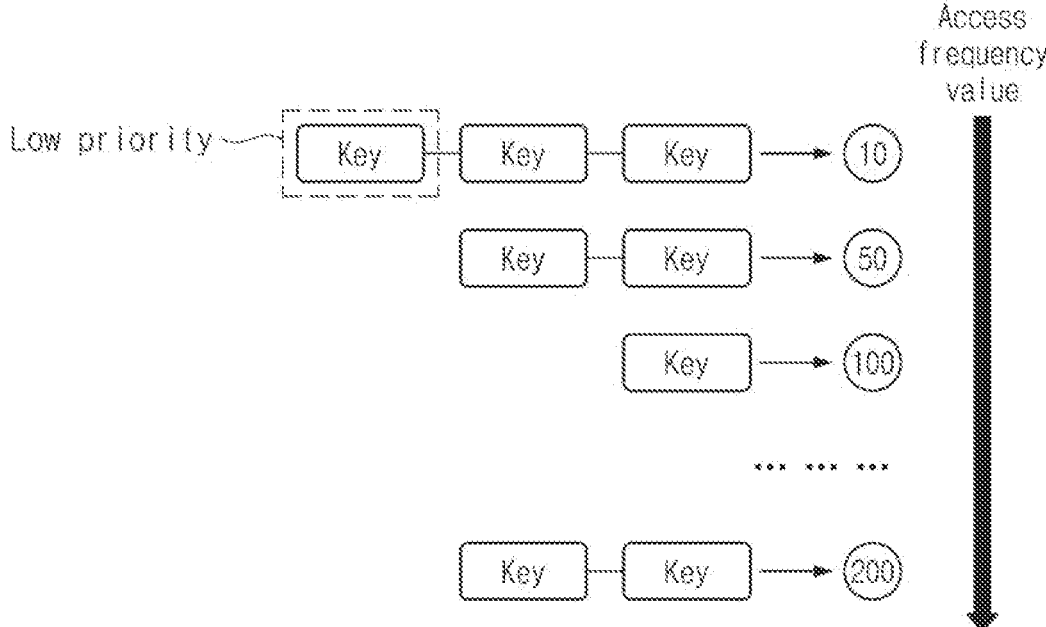
FIG. 2 is a diagram illustrating a Key eviction strategy according to a Allkeys-LFU algorithm.

When memory management is performed in the Redis database, an expiration time of a Key is set, and when the expiration time of the Key expires, the Redis database may remove the corresponding KV pair. In addition, when the memory space of the Redis database is insufficient, the Redis database may use a memory replacement strategy to update (e.g., evict) the KV pair. Specifically, the Redis database may evict the KV pair according to different priority algorithms, for example, a Allkeys-LFU algorithm (hereafter referred to as a LFU algorithm for short), which calculates a access frequency value of a Key, which may represent a priority of this Key, according to the number of times of accesses and a recent access time of this Key. As shown in FIG. 2, when different Keys have the same priority, these Keys are hung as nodes on the same linked list, and a head node of this linked list identifies a corresponding priority. When the memory space of the Redis database is insufficient, the Redis database may prioritize the eviction of KV pairs of which Keys have lower priorities. However, the method for the Redis database evicting the KV pairs is not limited to this, it may also use methods other than the LFU algorithm.

While the Redis databases have advantages of a fast speed of reading and writing and so on, the Redis databases may be configured such that an available host memory space is too small and/or a usage of the memory space is easy to reach an upper limit. Accordingly, various methods may increase the storage space of the Redis databases, of which two methods are mainly as follows:

(1) Using an Additional Hardware Apparatus to Support the Redis Database

For example, a method of creating the Redis database on a Flash is adopted, a Redis Enterprise version allows creating the Redis database on the Flash (Rof), this method uses a solid state hard disk (SSD) and a persistent memory to expand a capacity of a dynamic random access memory (DRAM), which may reduce a cost, but has a major drawback, namely that the access speed of the Redis databases is greatly reduced. For another example, a Redis database clustering method is adopted, which enables distributed storage of data by slicing the data and storing different data on different master nodes, thereby solving a problem of storing massive amounts of data, but also bringing problems of maintenance difficulties and high costs correspondingly.

(2) Internal Optimization of the Redis Database

For example, the Redis databases use an additional well-designed data structure to store data to save storage space as much as possible, but the saved storage space is very limited. For another example, the Redis database adopts a data compression algorithm to compress data to be stored in order to alleviate lack of the storage space of the Redis database, but it does not solve the problems in essence.

Furthermore, even if the problem of too small available memory in the Redis databases is addressed, it may not ensure that the Redis databases can operate in a high-capacity, high-speed, single, efficient and stable environment.

In addition, in addition to the potential problem of too small available memory, the Redis database also may have problems with the memory management. Specifically, the Redis database adopts the KV pairs as data storage manner; however, the Redis database currently does not take into account the length of the Value in the KV pair (which is a factor), in its memory update strategy. If the priority algorithm of the Keys is used to perform memory update, the Redis database may generate many large-capacity Values in its memory. This is a waste for the Redis database, which already may have too small memory space. Therefore, there is also some room for improvement in the priority algorithm of the Keys.

To this end, example embodiments herein provide a method and device for data access on the memory database, which expands the memory of the memory database such as the Redis databases and so on, that is, utilizes a Computing Express Link (CXL) memory in addition to the host memory, mainly involving four models or strategies as shown in FIG. 3 that may improve performances of the Redis databases. Examples of this include a KV pair adhesion model, a two-level eviction queue strategy of KV pairs, a Key priority strategy, and a memory management strategy.

FIG. 4 is an overall flowchart illustrating a method for data access according to one or more embodiments of the disclosure.

As shown in FIG. 4, at step S410, a Key of a first KV pair is written to a host memory in response to a write request to write the first key-value pair to a memory database, wherein the first KV pair is a KV pair to be written. At step S420, whether to write a Value of the first KV pair to the host memory or a Computing Express Link (CXL) memory is determined based on a length of the Value of the first KV pair. Wherein, a protocol adopted by the CXL memory enables addressing of a memory of an apparatus in a uniform manner, so that the CXL memory may be accessed by the host central processing unit (CPU), and the host CPU accesses the CXL memory as if it were its own host memory. At step S430, the Value of the first KV pair is written to the host memory or the CXL memory based on a result of the determination. Steps S410, S420 and S430 are described in detail below with reference to FIG. 5.

Figure 5:
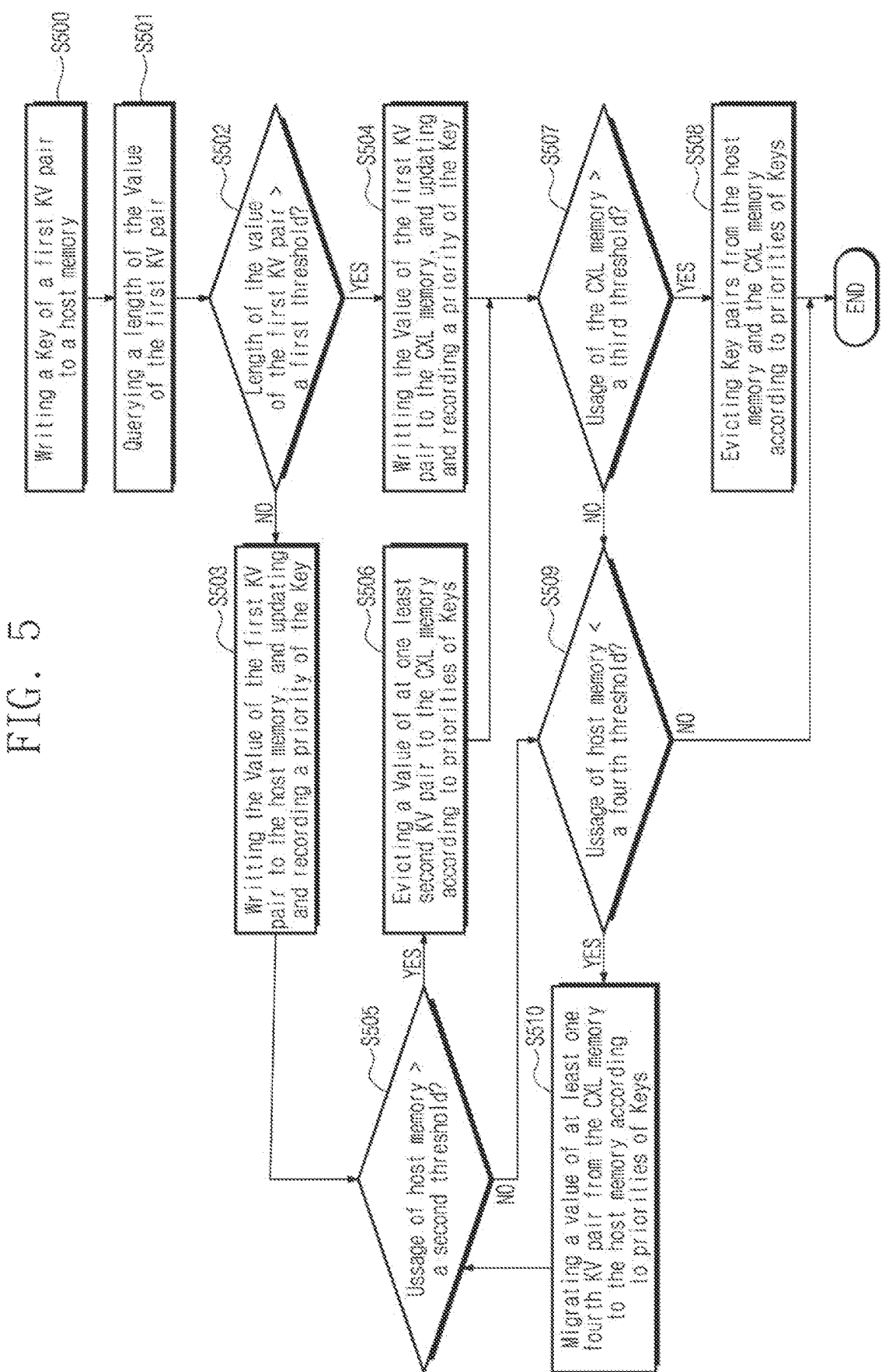
FIG. 5 is a flowchart illustrating a process for writing a first KV pair to a memory database according to one or more embodiments of the disclosure.

FIG. 5 is a flowchart illustrating a process for writing a first KV pair to a memory database according to one or more embodiments of the disclosure.

As shown in FIG. 5, at step S500, a Key of a first KV pair is written to a host memory in response to a write request to write the first key-value pair to a memory database.

At step S501, a length of the Value of the first KV pair is queried.

At step S502, whether the length of the Value of the first KV pair is greater than or equal to a first threshold is determined, wherein the first threshold may be, for example, maxValue× ⅛, and the maxValue is configurable.

If the length of the Value of the first KV pair is less than the first threshold, at step S503, writing the Value of the first KV pair to the host memory is determined, and the Value of the first KV pair is written to the host memory, and a priority of the Key of the first KV pair is updated and recorded.

If the length of the Value of the first KV pair is greater than or equal to the first threshold, at step S504, writing the Value of the first KV pair to the CXL memory is determined, and the Value of the first KV pair is written to the CXL memory, the priority of the Key is updated and recorded, and then it proceeds to step S507 (which will be described later).

In one or more embodiments of the disclosure, the updating and recording the priority of the Key of the first KV pair may include: updating and recording the priority of the Key of the first KV pair according to a access frequency value of the Key of the first KV pair and the length of the Value of the first KV pair, wherein the priority of the Key may be recorded (i.e., stored) in the host memory. The process of determining or updating the priority of the Key will be described in detail with reference to FIG. 11 later.

Figure 6:
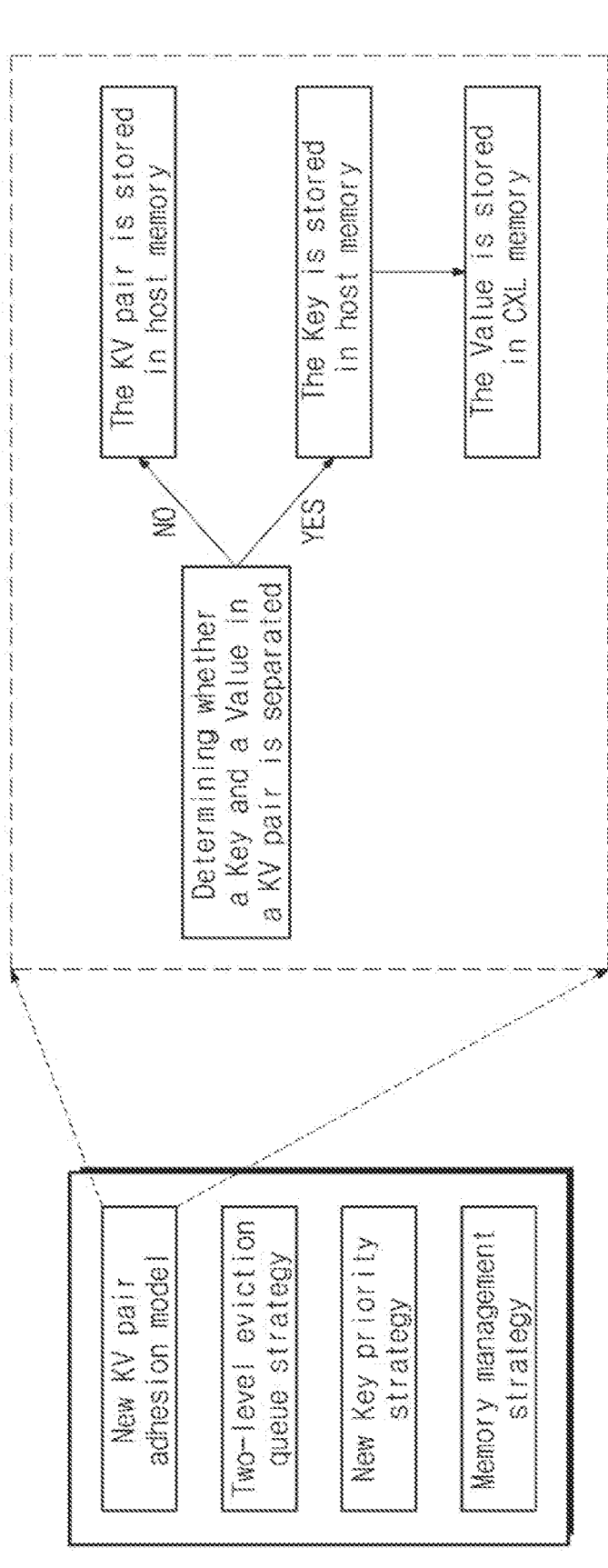
FIG. 6 is a schematic diagram illustrating a KV pair adhesion model according to one or more embodiments of the disclosure.
Figure 7:
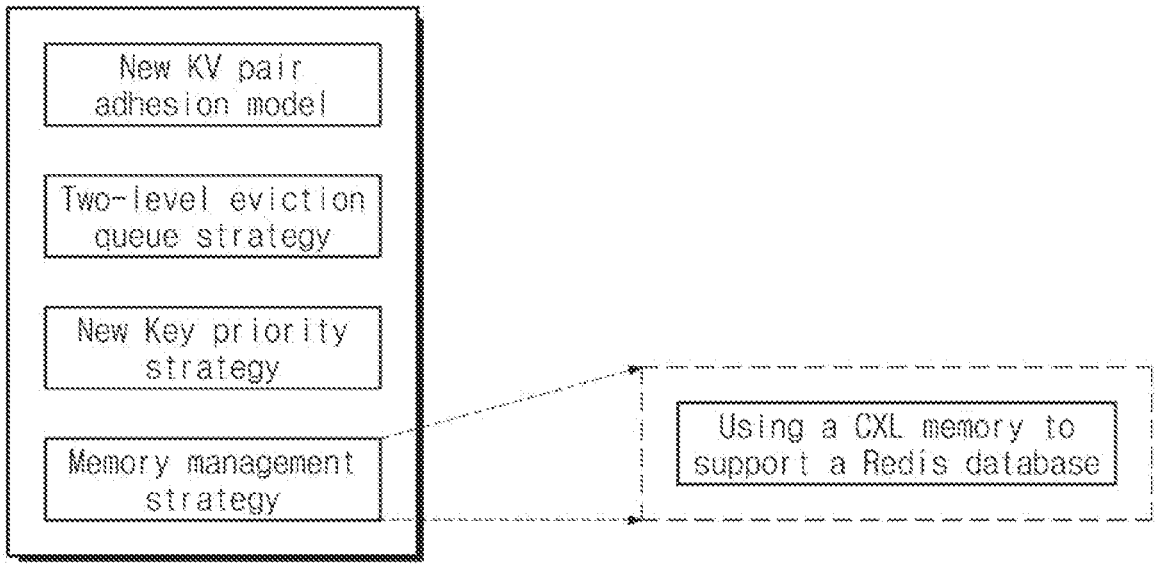
FIG. 7 is a schematic diagram illustrating a memory management strategy according to one or more embodiments of the disclosure.

Here, one or more embodiments adopt a KV pair adhesion model shown in FIG. 6 and a memory management strategy shown in FIG. 7. In detail, since most operations firstly access the Key of the KV pair, an access frequency to the Key is much higher than that to the Value. In addition, a command mode of the Key is not the same as that of the Value, the Key is only an identifier, and the Key usually requires little storage space compared with the Value. One or more embodiments use a CXL memory to support the Redis database simultaneously, as shown in FIG. 7, in addition to a host memory of the Redis database. Therefore, as shown in FIG. 6, in this KV pair adhesion model, when a KV pair to be written (e.g., the first KV pair mentioned above) is generated, the Key of the KV pair to be written is written to the host memory, and if a length of the Value of the KV pair to be written is greater than or equal to a first threshold, writing the Value to the CXL memory is determined and this writing operation is performed, which may save the storage space of the host memory, so that the host memory is enable storing complete KV pairs as many as possible by storing more small Values, to improve a data access hit rate. In addition, When the CXL memory is applied, by simply modifying an Application Programming Interface (API) to make the Redis database compatible with a CXL storage protocol, it may make the CXL storage possible coordinate with the host memory without damaging an original storage architecture and a access mode of the Redis database. This not only increases the total available storage space of the Redis database to make the Redis database store more data, but also ensures an access speed, i.e., improves a storage efficiency and does not cause a access mode conflict.

If step S503 is performed, that is, writing the Value of the first KV pair to the host memory is determined and this writing operation is performed, whether at least a portion of the Values in the host memory is migrated to the CXL memory is determined based on a usage of the host memory.

Specifically, step S505 is performed after step S503, whether the usage of the host memory is greater than a second threshold is determined, wherein the second threshold is configurable and may be, for example, 80%, but embodiments of the disclosure are not limited thereto, it may also be, for example, 85%, 75%, and the like. If it is determined that the usage of the host memory is greater than the second threshold at step S505, then at step S506, the Value of at least one second KV pair is evicted to the CXL memory according to the recorded priorities of Keys of KV pairs, so that the usage of the host memory is not greater than the second threshold, wherein the at least one second KV pair is a KV pair of which a Key is in the lowest priority order among KV pairs written in the host memory. For example, the Value of at least one second KV pair with the lowest priority order in the host memory is evicted to the CXL memory in ascending order of the priorities of Keys corresponding to each Value written in the host memory (e.g., starting a LoadtoCold thread to perform this eviction operation). Thereafter, it proceeds to step S507 (which will be described later). If it is determined that the usage of the host memory is less than or equal to the second threshold at step S505, it proceeds to step S509 (which will be described later).

If step S504 is performed, that is, writing the Value of the first KV pair to the CXL memory is determined and this writing operation is performed, or step S506 is performed, that is, the Value of the at least one second KV pair in the host memory is evicted to the CXL memory, whether to remove at least a portion of the Values from the CXL memory and to remove the corresponding at least one Key from the host memory is determined according to a usage of the CXL memory.

Specifically, after step S504 or S506 is performed, it proceeds to step S507, whether the usage of the CXL memory is greater than a third threshold is determined. If it is determined that the usage of the CXL memory is greater than the third threshold at step S507, at step S508, the Key and the corresponding Value are evicted from the host memory and the CXL memory, respectively, according to the recorded priorities of the Keys of the KV pairs, that is, the KV pair is evicted.

In one or more embodiments at step S508, the Key and the Value of at least one third KV pair may be evicted from the host memory and the CXL memory, respectively, to a persistent memory according to the recorded priorities of Keys of the KV pairs, so that the usage of the CXL memory is not greater than the third threshold, wherein the at least one third KV pair is a KV pair of which a Key is in the lowest priority order. For example, in an ascending order of the priorities of the Keys corresponding to each Value written in the CXL memory, the Value of the at least one third KV pair with the lowest priority order of the Key is evicted from the CXL memory to the persistent memory, and the Key of the at least one third KV pair is evicted from the host memory to the persistent memory.

In one or more embodiments at step S508, the Key and the Value of at least one third KV pair may be deleted from the host memory and the CXL memory, respectively, rather than being evicted to the persistent memory, according to the recorded priorities of the Keys of the KV pairs, so that the usage of the CXL memory is not greater than the third threshold, wherein the at least one third KV pair is a KV pair of which a Key is in the lowest priority order.

In one or more embodiments of the disclosure, the Load-toDestory thread may be started to perform the delete or eviction operation in the above step S508. In addition, the third threshold is configurable, for example, may be 80%, but embodiments of the disclosure are not limited to this and it may also be, for example, 85%, 75%, etc.

Figure 8:
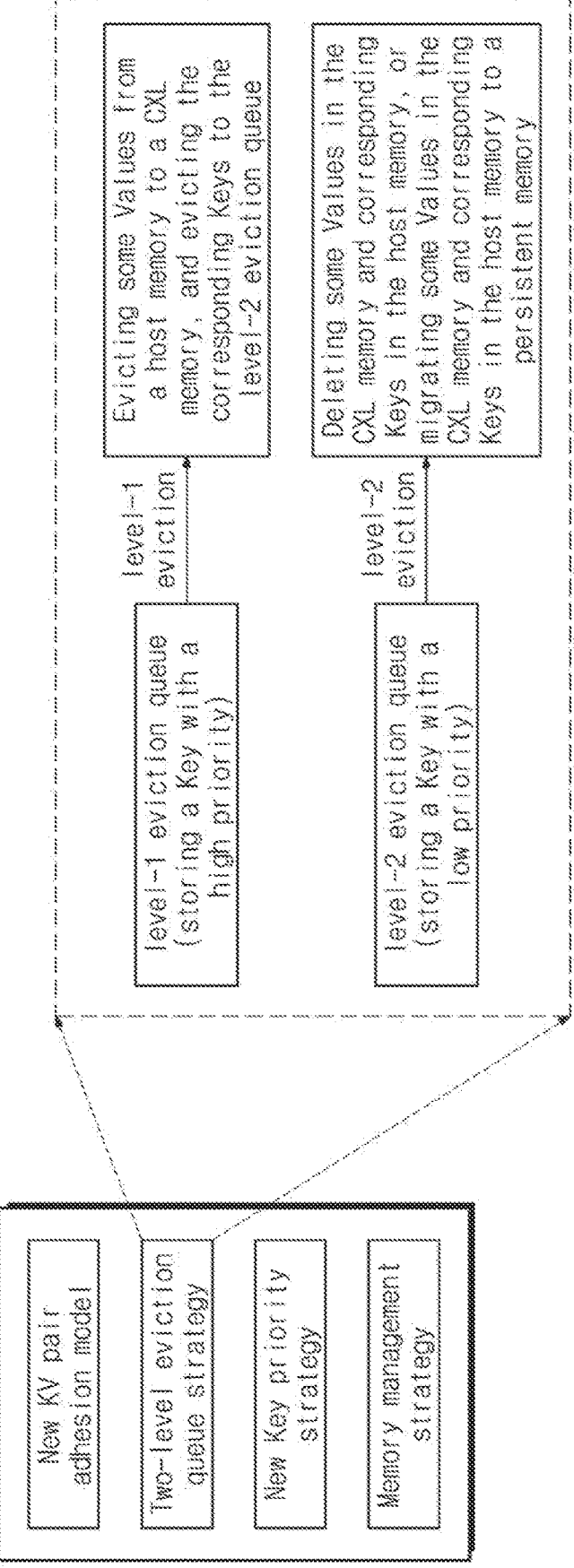
FIG. 8 is a schematic diagram illustrating a two-level eviction queue strategy according to one or more embodiments of the disclosure.

In detail, in one example, when the usage of the host memory of the Redis database reaches a threshold (e.g., when the host memory is fully used), the Redis database directly removes a KV pair of which a Key in a lower priority from the host memory, but here, one or more embodiments use two-level eviction queues as shown in FIG. 8, wherein a level-1 eviction queue includes Keys corresponding to each Value stored in the host memory and a level-2 eviction queue includes Keys corresponding to each Value stored in the CXL memory, and priorities of the keys included in the level-1 eviction queue is higher than those of level-2 eviction queue. When the usage of the Redis database is greater than the second threshold, the level-1 eviction queue starts working, a portion of the Values are evicted (i.e., migrated) from the host memory to the CXL memory, and the Keys corresponding to this portion of the Values are evicted from the level-1 eviction queue to the level-2 eviction queue, according to the priorities of the Keys in the host memory. When the Usage of the CXL memory is greater than the third threshold, the level-2 eviction queue starts working, at least a portion of the Values in the CXL memory and at least one corresponding Keys in the host memory are removed or migrated to the persistent memory, according to the priorities of the Keys corresponding to each Value written in the CXL memory.

Figure 9:
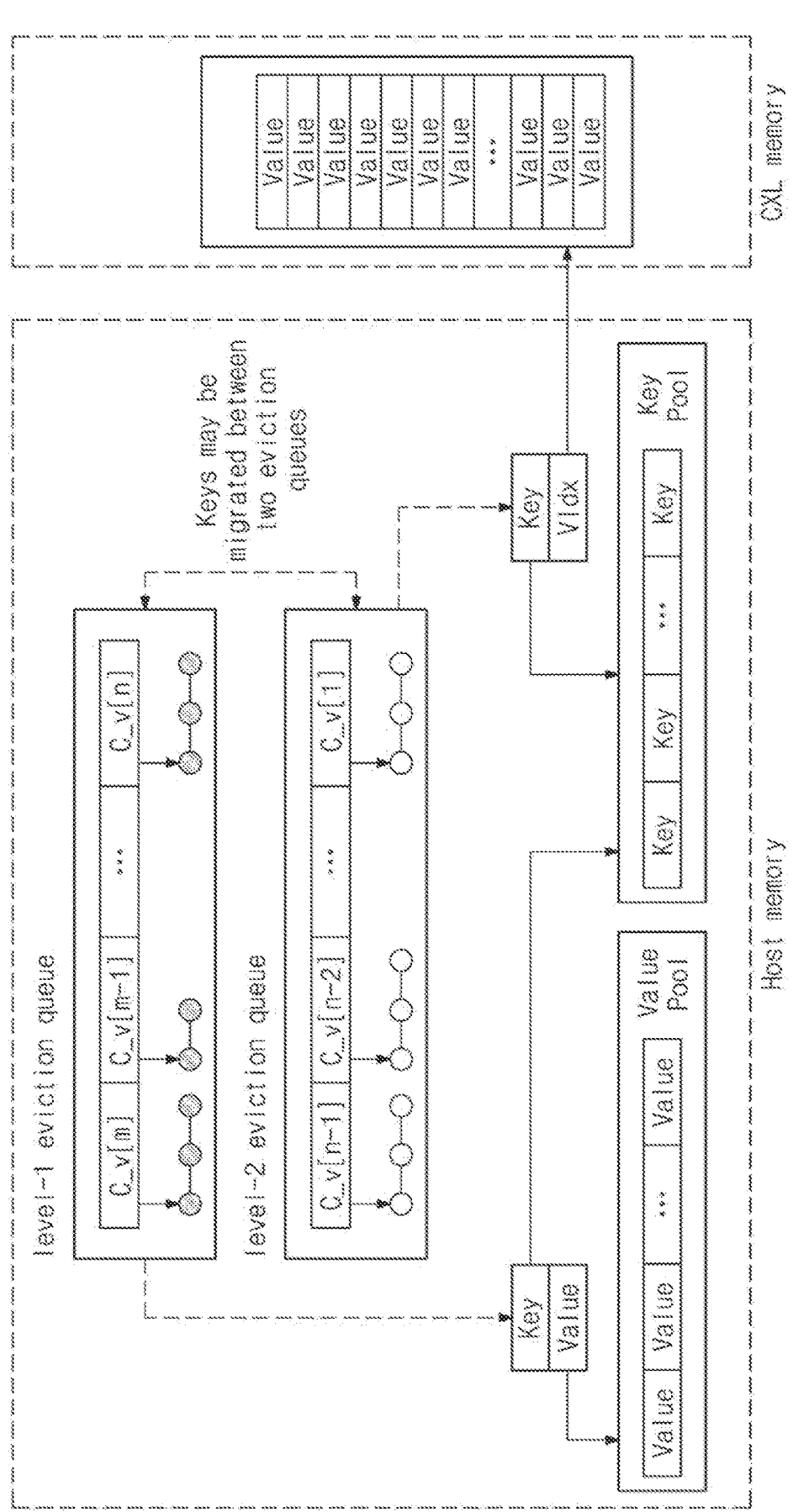
FIG. 9 is a diagram illustrating an effect of a two-level eviction queue according to one or more embodiments of the disclosure.

In addition, FIG. 9 is a diagram illustrating an effect of two-level eviction queues according to one or more embodiments of the disclosure. As shown in FIG. 9, a level-1 eviction queue and a level-2 eviction queue are each constructed in a form of a two-level linked list, wherein the level-1 eviction queue contains Keys with higher priorities (solid circles in FIG. 9 represent the Keys with higher priorities), and the level-2 eviction queue contains Keys with lower priorities (hollow circles in FIG. 9 represent the Keys with lower priorities). For each eviction queue, each node in a first level linked list of the two-level linked list thereof is one single linked list, wherein each node in each single linked list contains one Key, and the single linked list to which each Key belongs is determined according to a hash value of each Key (i.e., a hash value of a Key is calculated, and then a single linked list under which node in the first level linked list to which the Key belongs is determined according to this hash value, that is, indexes (such as m, m-1 . . . n, etc.) of the corresponding nodes in the first level linked list are determined). As shown in FIG. 9, each Key in the level-1 eviction queue and its corresponding Value are stored in the host memory, and each Key in the level-2 eviction queue and an address (i.e., VIdx) of its corresponding Value in the CXL memory are stored in the host memory, but its corresponding Value is stored in the CXL memory. Therefore, when a Value in the CXL memory should be read, a corresponding Value may be retrieved from the CXL memory according to a VIdx stored in the host memory.

In the above, using the level-1 eviction queue and level-2 eviction queue to store the Keys in the Redis database and evicting the KV pairs according to the two-level eviction strategy, may clarify boundaries of the KV pairs for facilitate management.

If it is determined that the usage of the CXL memory is less than or equal to the third threshold at step S507, it should determine whether to migrate at least a portion of the Values in the CXL memory to the host memory according to the usage of the host memory. In addition, as described above, if it is determined that the usage of the host memory is less than or equal to the second threshold at step S505, it likewise should determine whether to migrate at least a portion of the Values in the CXL memory to the host memory according to the usage of the host memory. That is, if step S507 is NO or step S505 is NO, it proceeds to step S509.

Specifically, at step S509, whether the usage of the host memory is less than a fourth threshold is determined, wherein the fourth threshold is configurable and should be less than the second threshold, e.g., the fourth threshold may be 40%, but embodiments of the disclosure are not limited thereto, and it may be, for example, 35%, 45%, etc. If it is determined that the usage of the host memory is less than the fourth threshold at step S509, then at step S510, a Value of at least one fourth KV pair is migrated from the CXL memory to the host memory according to the recorded priorities of the Keys of the KV pairs, so that the usage of the host memory is not less than the fourth threshold, wherein the at least one fourth KV pair is a KV pair of which a Value is written to the CXL memory and of which a Key is in the highest priority order. For example, in a descending order of the priorities of the Keys corresponding to each Value stored in the CXL memory, the Value of the at least one fourth KV pair with the highest priority order is migrated from the CXL memory to the host memory (e.g., by starting the LoadtoHot thread to perform this migration operation), that is, in this case, the Value of the at least one fourth KV pair may be determined from CXL memory in a descending order of the priorities of the Keys of the KV pairs, and then this Value of the at least one fourth KV pair may be migrated from the CXL memory to the host memory, regardless of whether a length of the Value is greater than or equal to the first threshold. Thereafter, it returns to step S505. If it is determined that the usage of the host memory is greater than or equal to the fourth threshold at step S509, it ends.

In one or more embodiments at step S509, if the usage of the host memory is less than the fourth threshold, then at step S510, a Value of at least one fifth KV pair is migrated from the CXL memory to the host memory according the recorded priorities of the Keys of the KV pairs, so that the usage of the host memory is not less than the fourth threshold, wherein the at least one fifth KV pair is a KV pair, of which a Value is written to the CXL memory, of which a length of the Value is less than the first threshold, and which is determined in a descending order of the priorities of the Keys. That is, the Value of the at least one fifth KV pair is not only written to the CXL memory and its Value should be less than the first threshold, and the at least one fifth KV pair is at least one KV pair determined in the descending order of priorities of the Keys, and in this embodiment, if there is no Value less than the first threshold in the CXL memory, it likewise ends.

Here, by migrating at least a portion of the Values in the CXL memory to the host memory when the usage of the host memory is less than the fourth threshold, the storage space of the host memory may be reasonably utilized, so that the host memory store complete KV pairs as many as possible, to improve the data access hit rate. Further, if at least a portion of the Values in the CXL memory, which is less than the first threshold, is migrated to the host memory when the usage of the host memory is less than the fourth threshold, it may enable the host memory to store more complete KV pairs having less lengths of Values, to further improve the data access hit rate. In addition, the above processes may ultimately achieve a balanced steady state of the host memory and the CXL memory used by the Redis database, thereby achieving a reasonable utilization of the storage space.

Figure 10:
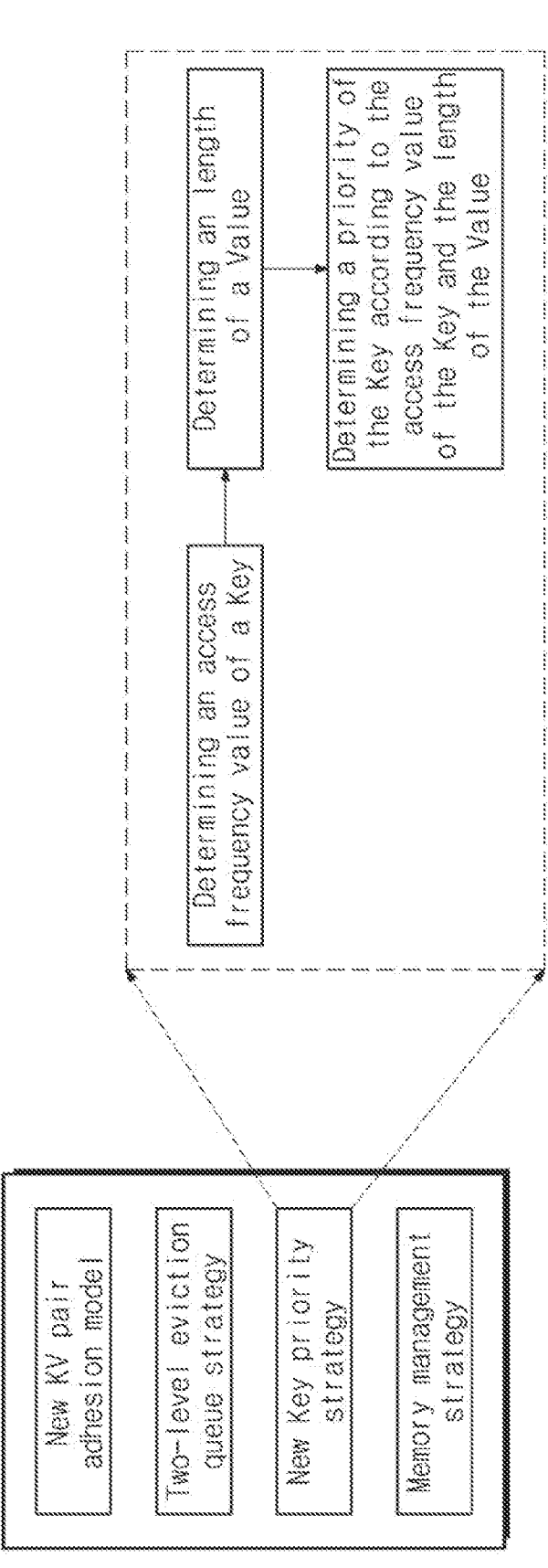
FIG. 10 is a schematic diagram illustrating a Key prioritization strategy according to one or more embodiments of the disclosure.

In the above descriptions, the priority of the Key may be determined or updated according to any known method, however, a Key priority strategy (hereinafter referred to as a LFU-V algorithm) as shown in FIG. 10 may also be adopted to determine or update the priority of the Key. That is, the priority of the Key is determined or updated according to an access frequency value of the Key of the KV pair and a length of the Value of this KV pair. Specifically, the Key's access frequency value is determined according to existing methods (e.g., LFU algorithm), a Value influence factor vf is determined according to the length of the Value, and then the priority of the Key is calculated according to the Key's access frequency value and the corresponding Value influence factor. This is described in detail below with reference to FIG. 11.

Figure 11:
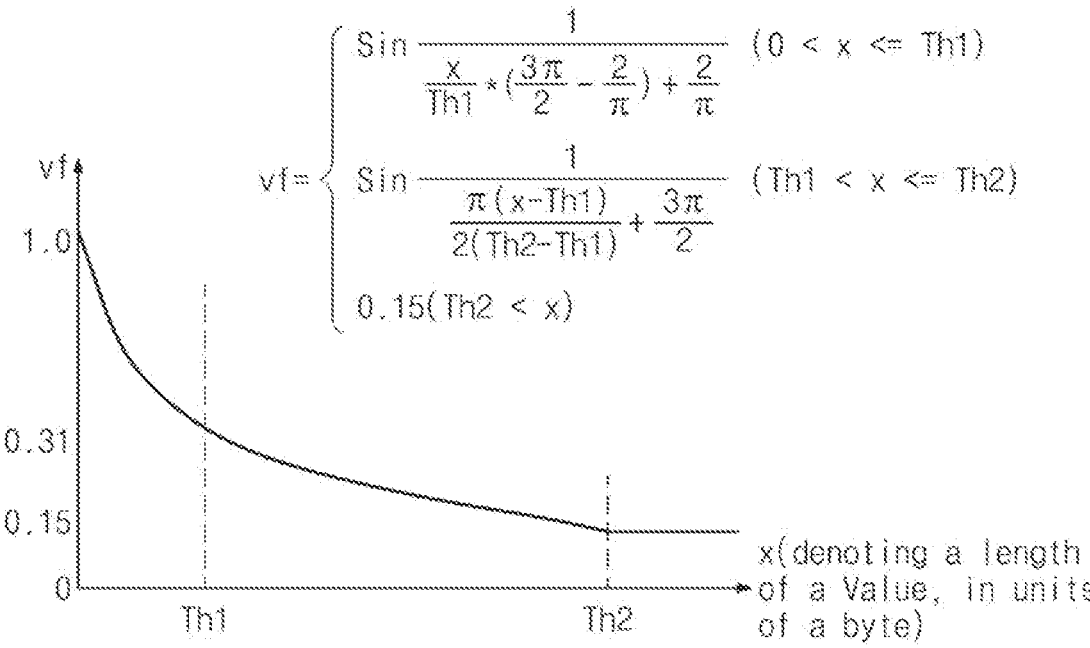
FIG. 11 is a schematic diagram illustrating a relationship between a Value length and a Value impact factor vf according to one or more embodiments of the disclosure.

FIG. 11 is a diagram illustrating a relationship between a Value length and a Value impact factor vf according to one or more embodiments of the disclosure.

In one example, when determining a priority of a Key, the number of times of accesses and/or a recent access time of the Key may be considered without considering a factor which is a length of a Value in a KV pair. In the Key priority strategy (i.e., LFU-V algorithm) of one or more embodiments of the disclosure, not only the number of times of accesses and/or the recent access time of the Key are considered, but also the length of the Value is considered. For different types of Value, the configurable maximum length thereof is different, but the length of the Value does not easily reach the maximum length regardless of the type of the stored Value. In order to make it easier for a Value with a less length to have a greater impact on the priority of the Key, one or more embodiments of the disclosure adopt a piecewise curve as shown in FIG. 11 to characterize the relationship between the length of the Value and the Value impact factor vf. In FIG. 11, the curve is divided into three sections by thresholds Th1 and Th2, wherein the thresholds Th1 and Th2 are configurable, for example, the threshold Th1 may be 16 KB and the threshold Th2 may be 64 MB, but embodiments of the disclosure are not limited thereto and the thresholds Th1 and Th2 may be other values. It can be seen from FIG. 11 that, when the length of the Value is less than the threshold Th2, the larger the length of the Value, the less the Value impact factor vf calculated according to the LFU-V algorithm of one or more embodiments of the disclosure, and the less the length of Value, the larger the Value impact factor vf calculated according to the LFU-V algorithm of one or more embodiments of the disclosure; when the length of the Value is greater than or equal to the threshold Th2, the Value impact factor vf is a fixed value. In addition, the curve shown in FIG. 11 and a corresponding piecewise function are only an example, and other curves and piecewise functions may be used in embodiments of the disclosure, as long as they may reflect a characteristic that the less the length of the Value, the larger the Value impact factor vf.

In one or more embodiments of the disclosure, a priority Counter_V of a Key may be determined according to the following equation (1):

$$Counter\_V = \lfloor Counter \times vf \rfloor \qquad (1)$$

That is, the priority Counter_V of the Key is obtained by rounding down a result of Counter×vf, wherein the Counter denotes an access frequency value of the Key, which may be determined by any related method, for example, by the LFU algorithm.

In the above, the priority of the Key is determined by considering the length of the Value, it makes it possible to prioritize the eviction of a Values with large lengths or the deletion or the eviction of KV pairs of the Values with large lengths when it should evict Values or delete or evict KV pairs according to the priorities, thereby releasing more storage space to store more data.

In the above, the process of writing a KV pair to a memory database is described above, and the process of reading a KV pair from a memory database in response to a read request to read the KV pair in the method for data access is described below.

FIG. 12 is a flowchart illustrating a process for reading the Value of a KV pair from persistent memory or from host memory or CXL memory according to one or more embodiments of the disclosure.

As shown in FIG. 12, in response to a read request to read a sixth KV pair, at step S1201, whether a Key of the sixth KV pair is hit in a host memory is determined. In other words, whether the Key of the KV pair is stored in the host memory is determined.

If the Key of the sixth KV pair is not hit in the host memory, at step S1206, the sixth KV pair is read from the persistent memory. In other words, retrieval is performed from the persistent memory according to the Key of the sixth KV pair and a retrieval result is returned. Specifically, if the Value of the sixth KV pair is retrieved in the persistent memory, the retrieved Value is returned, otherwise a result indicating that the Value is not retrieved is returned. That is, in response to a read request to read the sixth KV pair, if the Key of the sixth KV pair is not hit in the host memory, the sixth KV pair is read from the persistent memory.

If the Key of the sixth KV pair is hit in the host memory, at step S1202, whether the Value of the sixth KV pair is written to the host memory is determined. If it is determined that the Value of the sixth KV pair is written to the host memory at step S1202, at step S1203, the Value of the sixth KV pair is read from the host memory, i.e., the sixth KV pair is read. That is, if the Key of the sixth KV pair is hit in the host memory and the Value of the sixth KV pair is written to the host memory, the sixth KV pair is read from the host memory. Then, it proceeds to step S1204, a priority of the Key of the sixth Key pair is updated and recorded. Specifically, an access frequency value of the Key may be calculated firstly (for example, the access frequency value of the Key may be calculated according to the related LFU algorithm), and then the priority of the Key is calculated according to the above equation (1), and thus the priority of the Key is updated and recorded.

If it is determined that the Value of the sixth KV pair is not written to the host memory at step S1202, at step S1205, whether the Value of the sixth KV pair is written to the CXL memory is determined according to the Key of the sixth KV pair. If it is determined that the Value of the sixth KV pair is written to the CXL memory at step S1205, at step S1207, a mapping address (VIdx as shown in FIG. 9) in the CXL memory mapped to the Key is looked up according to the Key of the sixth KV pair, and the Value of the sixth KV pair is read from the CXL memory according to the looked-up mapping address. That is, if the Key of the sixth KV pair is hit in the host memory and the Value of the sixth KV pair is not written to the host memory, the Value of the sixth KV pair is read from the CXL memory according to the Key of the sixth KV pair. Then, step S1204 is performed as described above. If it is determined that the Value of the sixth KV pair is not written to the CXL memory at step S1205, it proceeds to step S1206 as described above.

A software architecture diagram according to one or more embodiments is described below with reference to FIG. 13.

Figure 13:
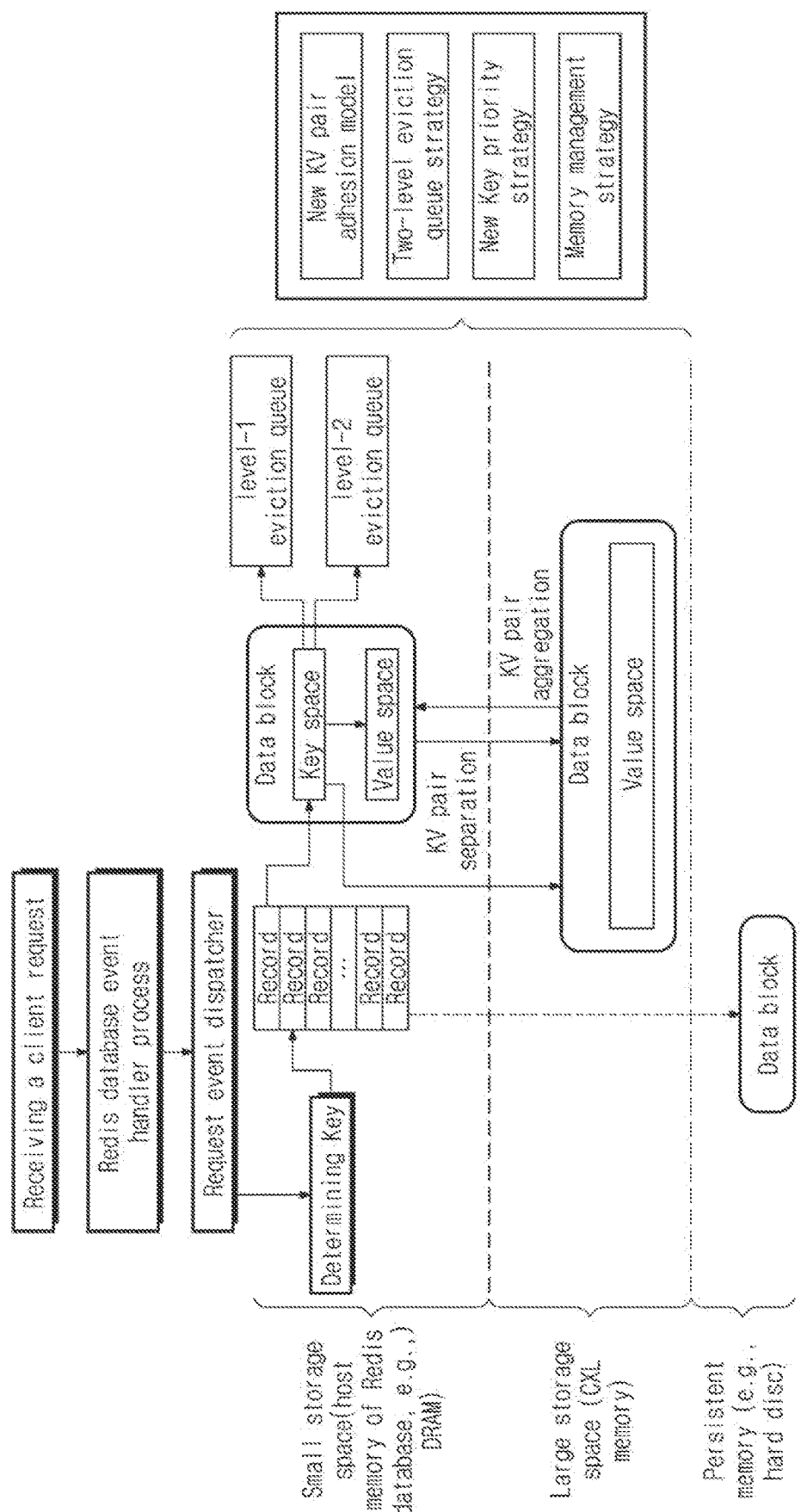
FIG. 13 is a schematic diagram illustrating a software architecture to which one or more embodiments of the disclosure is applied.

FIG. 13 is a schematic diagram illustrating an example of a software architecture.

As shown in FIG. 13, firstly, a client request (e.g., a read request) is received, and then this client request is transmitted, by a Redis database event handler process, to a request event scheduler, thereafter the request event scheduler determines (or selects) a corresponding Key from a host memory (e.g., DRAM) of the Redis database according to the client request.

Then, by utilizing the Key in the client request, a Value corresponding to this Key is retrieved from each Record in the Redis database. Specifically, as shown in FIG. 13, Keys in the Redis database are located in a Key space of the host memory, and Values are located in a Value space of the host memory and/or a CXL memory, and the Keys in the Redis database are managed using a level-1 eviction queue and a level-2 eviction queue according to priorities of the Keys, wherein, Values corresponding to Keys contained in the level-1 eviction queue are stored in the host memory of Redis database, and Values corresponding to Keys contained in the level-2 eviction queue are stored in the CXL memory. Therefore, whether the Key in the client request exists in the Key space of the host memory is determined firstly, and if not, an access miss occurs, and then a database in a persistent memory is retrieved using the Key and a retrieval result is returned. If the Key in the client request exists in the Key space of the host memory, an access hit occurs and a corresponding Value is retrieved in the host memory using the Key. If the Value corresponding to the Key does not exist in the host memory, the Value corresponding to the Key is retrieved in the CXL memory using the Key. If the Value is not retrieved in the CXL memory, an access miss occurs and then the database in the persistent memory is retrieved using the Key and a retrieval result is returned.

In addition, as shown in FIG. 13, when Values of some of the KV pairs in the host memory are evicted to the CXL memory according to the priorities of the Keys, a KV pair separation occurs, i.e., the Keys and Values in the KV pairs are separated, and then the separated Values are evicted from the host memory to the CXL memory. In contrast, when the usage of the host memory is less than the fourth threshold, a KV pair aggregation occurs, i.e., some of the Values in the CXL memory are migrated to the host memory according to the descending order of the priorities of the Keys, and then the Values migrated to the host memory are stored in aggregation with the corresponding Keys. Alternatively, when the usage of the host memory is less than the fourth threshold and there is a Value in the CXL memory that is less than the first threshold, the KV pair aggregation occurs, i.e., some of the Values in the CXL memory are migrated to the host memory according to the descending order of the priorities of the Keys, and then the Values migrated to the host memory are stored in aggregation with the corresponding Keys.

That is, in the above architecture diagram illustrated in FIG. 13, the KV pair adhesion model, the two-level eviction queue strategy of KV pairs, the Key priority strategy, and the memory management strategy illustrated in FIG. 3 are fully used to improve performances of the Redis database.

Figure 14:
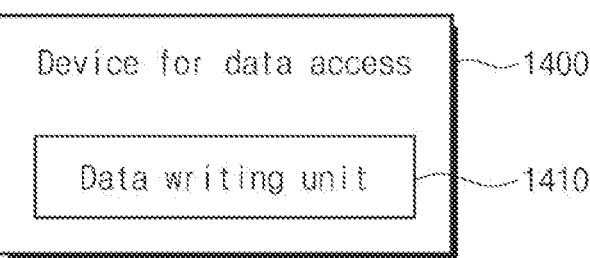
FIG. 14 is a block diagram illustrating a device for data access according to one or more embodiments of the disclosure.

In addition, one or more embodiments of the disclosure provide a device for data access. This is described below. FIG. 14 is a block diagram illustrating a device for data access 1400 according to one or more embodiments of the disclosure.

Referring to FIG. 14, the device for data access 1400 includes a data writing unit 1410.

The data write unit 1410 may be configured to: write a Key of a first KV pair to a host memory in response to a write request to write the first KV pair to the memory database, determine whether to write a Value of the first KV pair to the host memory or a CXL memory, based on a length of the Value of the first KV pair, and write the Value of the first KV pair to the host memory or the CXL memory based on a result of the determination.

That is, the data writing unit 1410 may perform various operations as described above with reference to FIGS. 5 to 11.

According to one or more embodiments of the disclosure, the data writing unit 1410 may be configured to determine whether to write the Value of the first KV pair to the host memory or to the CXL memory by: determining to write the Value to the CXL memory if the length of the Value is greater than or equal to a first threshold; determining to write the Value to the host memory if the length of the Value is less than the first threshold.

According to one or more embodiments of the disclosure, the device for data access 1400 further includes an update unit configured to update and record a priority of the Key of the first KV pair.

According to one or more embodiments of the disclosure, the data writing unit 1410 may further be configured to: determine whether a usage of the host memory is greater than a second threshold; if the usage of the host memory is greater than the second threshold, evict a Value of at least one second KV pair to the CXL memory according to the recorded priorities of Keys of KV pairs so that the usage of the host memory is not greater than the second threshold, wherein the at least one second KV pair is a KV pair of which a Key is in the lowest priority order among KV pairs written in the host memory; and/or determine whether a usage of the CXL memory is greater than a third threshold; if the usage of the CXL memory is greater than the third threshold, evict a Key and a Value of at least one third KV pair from the host memory and the CXL memory, respectively, to a persistent memory according to the recorded priorities of Keys of the KV pairs so that the usage of the CXL memory is not greater than the third threshold, wherein the at least one third KV pair is a KV pair of which a Key is in the lowest priority order.

According to one or more embodiments of the disclosure, the data writing unit 1410 may further be configured to: determining whether the usage of the host memory is less than a fourth threshold which is less than a second threshold; if the usage of the host memory is less than the fourth threshold, migrate a Value of at least one fourth KV pair from the CXL memory to the host memory according to the recorded priorities of Keys of KV pairs so that the usage of the host memory is not less than the fourth threshold, wherein the at least one fourth KV pair is a KV pair of which a Value is written to the CXL memory and of which a Key is in the highest priority order; or if the usage of the host memory is less than the fourth threshold, migrate a Value of at least one fifth KV pair from the CXL memory to the host memory according to the recorded priorities of Keys of KV pairs so that the usage of the host memory is not less than the fourth threshold, wherein the at least one fifth KV pair is a KV pair, of which a Value is written to the CXL memory, of which a length of the Value is less than the first threshold, and which is determined in a descending order of the priorities of the Keys.

According to one or more embodiments of the disclosure, the device for data access 1400 may further include a data reading unit. The data reading unit may be configured to: in response to a read request to read a sixth KV pair, read the sixth KV pair from a persistent memory if a Key of the sixth KV pair is not hit in the host memory; read the sixth KV pair from the host memory if the Key of the sixth KV pair is hit in the host memory and the Value of the sixth KV pair is written to the host memory; read the Value of the sixth KV pair from the CXL memory according to the Key of the sixth KV pair if the Key of the sixth KV pair is hit in the host memory and the Value of the sixth KV pair is not written to the host memory.

According to one or more embodiments of the disclosure, the update unit may be configured to update and record the priority of the Key of the first KV pair by: updating and recording the priority of the Key of the first KV pair according to a access frequency Value of the Key of the first KV pair and the length of the Value of the first KV pair.

Any relevant details related to the operations performed by the aforementioned units may be found in the corresponding descriptions provided above with respect to FIGS. 4 to 12. In addition, it is noted that, although the device for data access 1400 is divided above into units for performing respective processing, however, it is clear to those skilled in the art that the processing performed by each of the above units may also be performed without any specific division of the units of the device for data access 1400 or without any clear division between the units. Moreover, the manner of dividing the units of the device for data access 1400 is not limited to the example of FIG. 14, for example, any other reasonable division may also be used. The present disclosure does not limit a manner of dividing the units or modules of the device for data access 1400 in any way, as long as it is capable of performing the method for data access shown in FIG. 4. In addition, the device for data access 1400 may include other units, for example, a storage unit, etc.

It should also be understood that, the various units may be implemented as one or more electronic circuits, and that one or more of the various units described above may also be implemented as a single electronic circuit.

The examples of storage states of KV pairs illustrated in 16A, 16B, 16C and 16D are distinguished from the examples of storage states of KV pairs illustrated in FIGS. 15A and 15B as provided below.

Figure 15A:
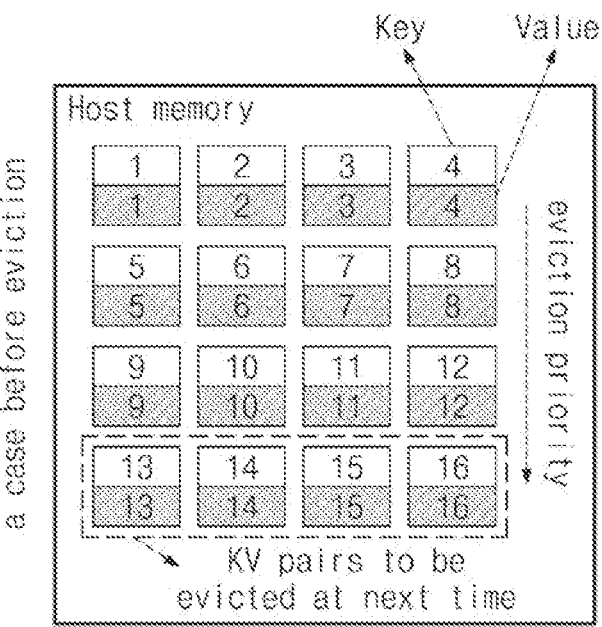
FIGS. 15A and 15B illustrate examples of storage states of KV pairs.
Figure 15B:
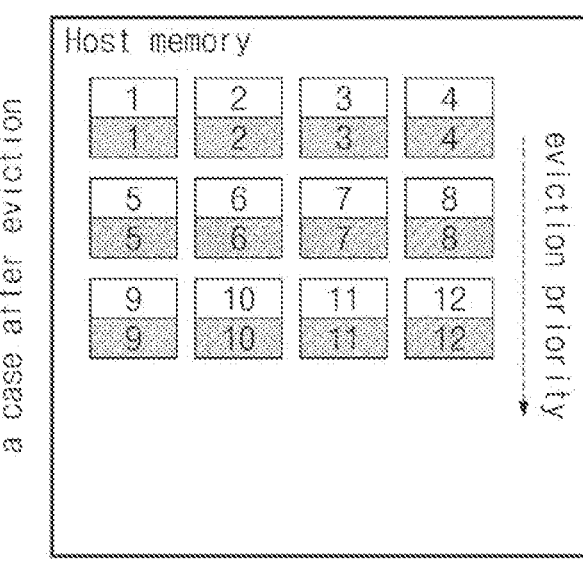
Figure 17A:
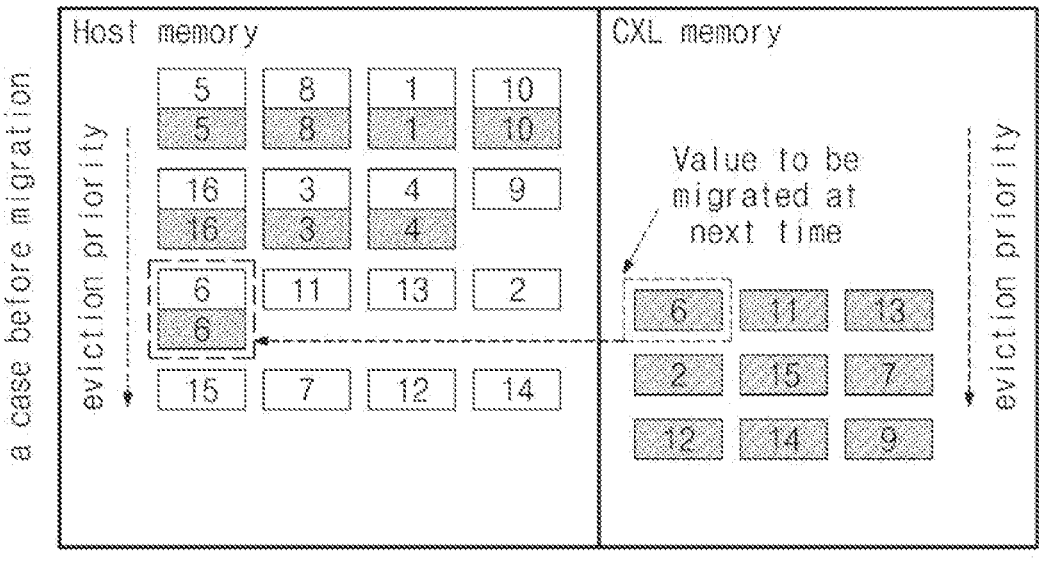
FIGS. 17A and 17B are diagrams illustrating examples of storage states of KV pairs.
Figure 17B:
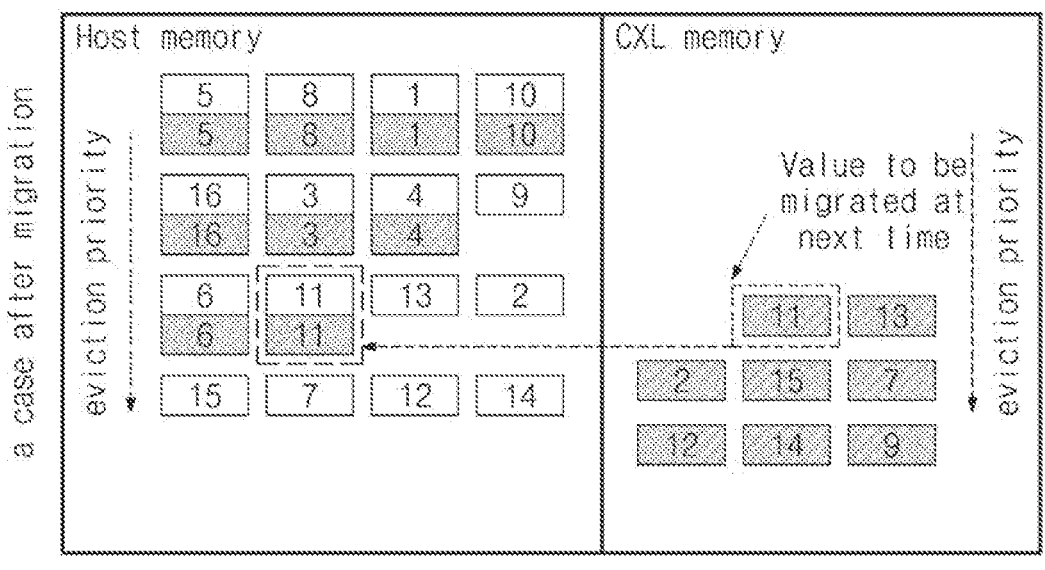
Figure 18A:
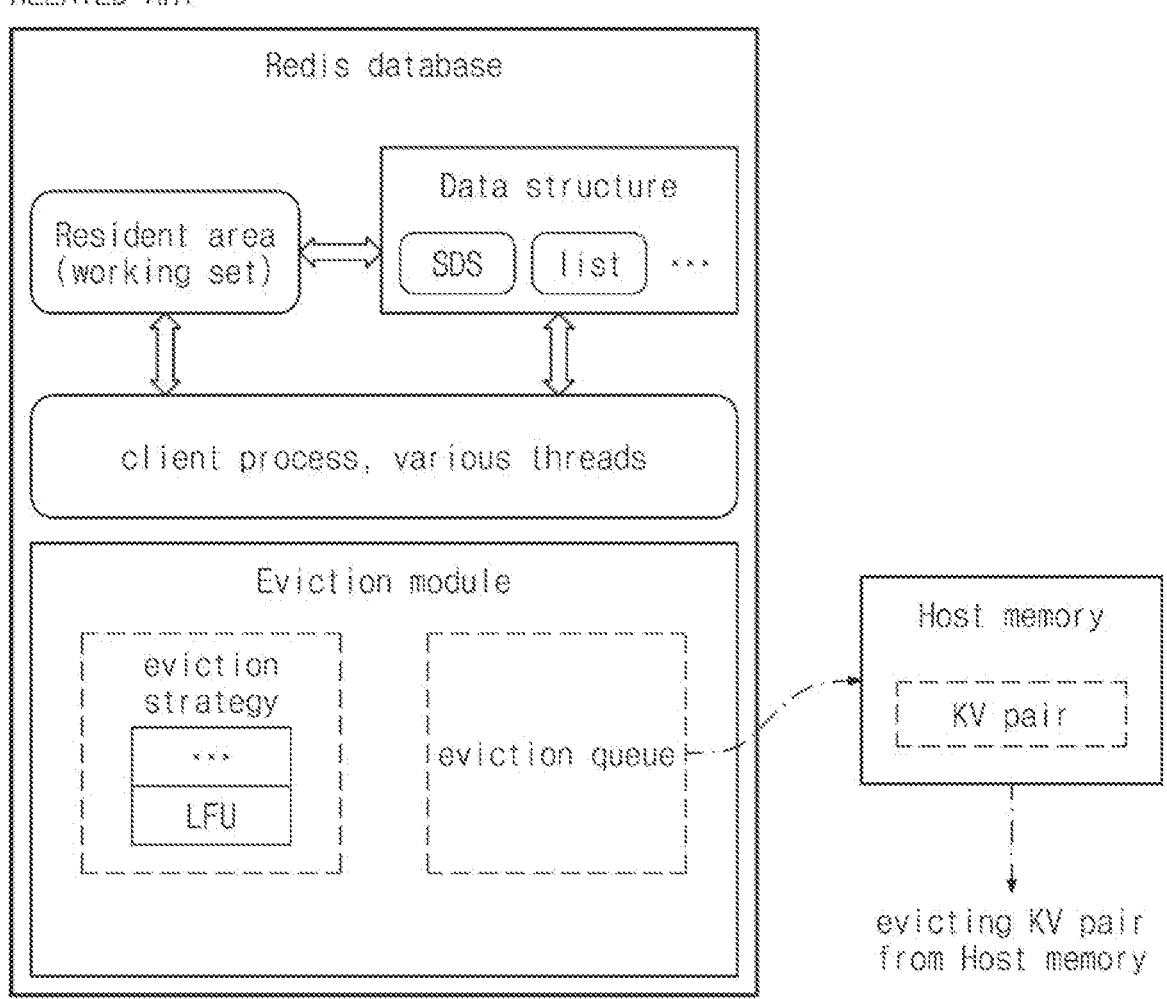
FIGS. 18A and 18B illustrate examples of storage architecture diagrams.
Figure 18B:
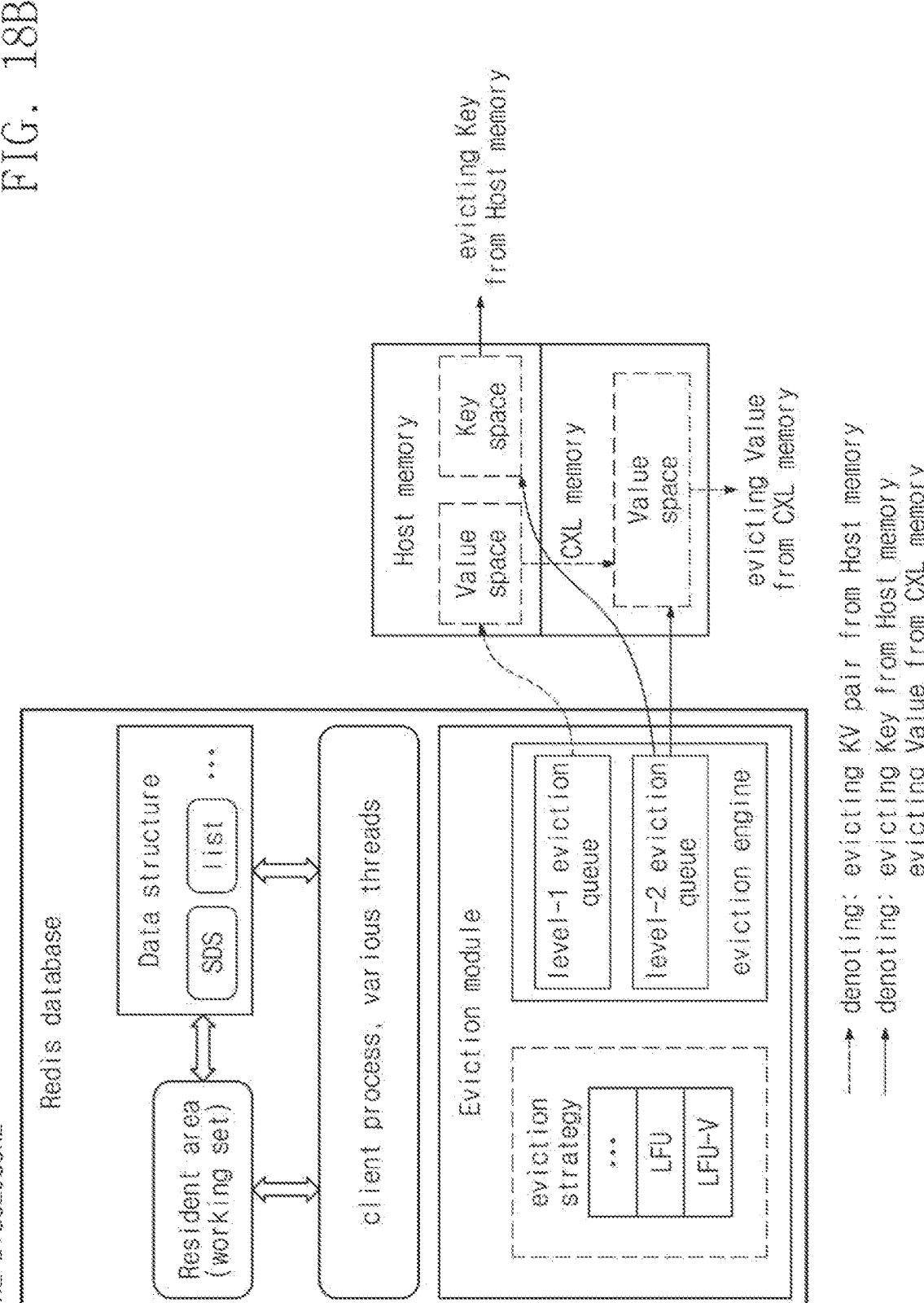

FIGS. 15A and 15B illustrate an example of storage states of KV pairs. FIGS. 16A, 16B, 16C, 16D, 17A and 17B are diagrams illustrating examples of storage states of KV pairs, respectively. FIGS. 18A and 18B illustrate examples of storage architecture diagrams. Here, the example of the storage architecture diagram illustrated in FIG. 18A may be associated with FIGS. 15A and 15B, and the example of the storage architecture diagram illustrated in FIG. 18B may be associated with FIGS. 16A, 16B, 16C, 16D, 17A and 17B.

Firstly, as shown in FIGS. 15A and 15B, a priority of a Key (i.e., eviction priority) is determined based on the number of times of accesses and a recent access time, however, this eviction strategy does not take into account an important factor which is a length of a Value. Accordingly, the example illustrated in FIGS. 15A and 15B may be a case where a Key of a KV pair, of which a Value has a too large length, has a high priority (e.g., Key (9) in FIG. 15A or 15B).

Figures 16A, 16B:
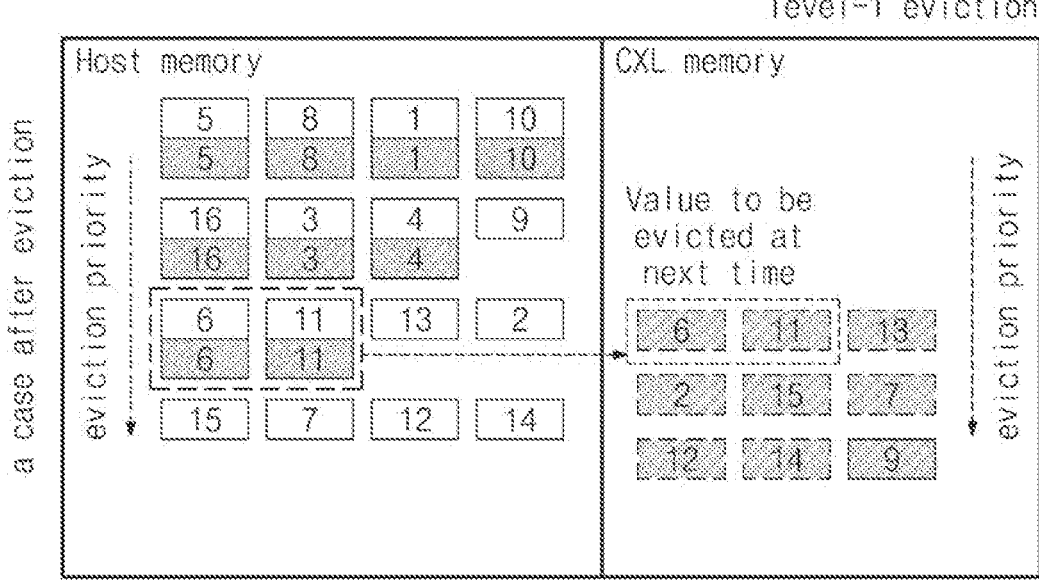
FIGS. 16A, 16B, 16C and 16D are diagrams illustrating examples of a storage state of KV pairs.
Figure 16C:
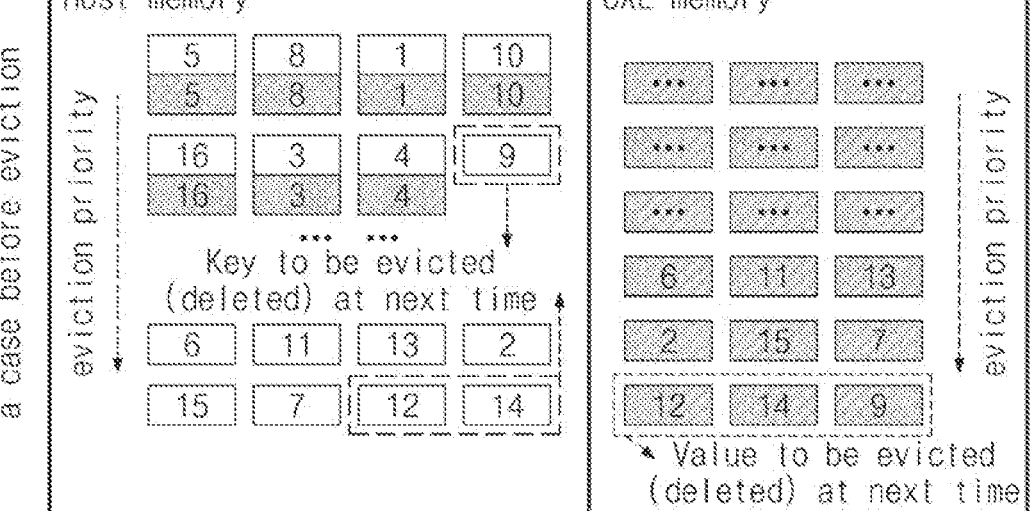
Figure 16D:
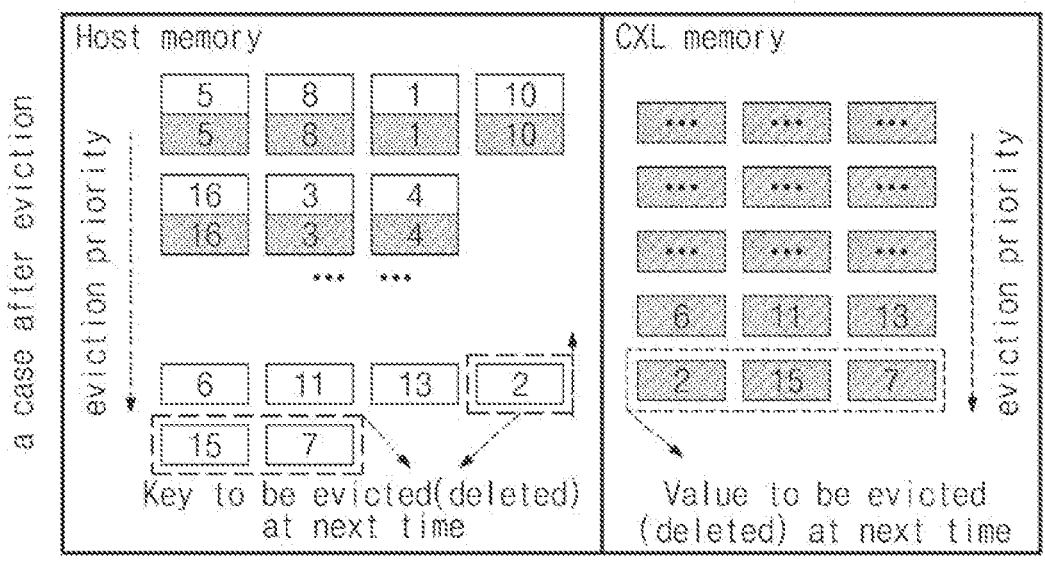

However, when the LFU-V algorithm of the example shown in FIG. 11 may be adopted, the priority of the Key (i.e., the eviction priority) is determined based on the number of times of accesses and the recent access time as well as the length of the Value, so that an order of eviction priorities of the Keys as shown in FIG. 16A is different from that as shown in FIG. 15A. For example, Key (2) with a large Value length is located in a position at the first row and second column in FIG. 15A, but Key (2) with a large Value length is located in a position at the third row and the fourth column in FIG. 16A, however, Keys (5) and (8) with small Value lengths are located in a position at the second row and the first column and a position at the second row and the fourth column, respectively, in FIG. 15A, however, Keys (5) and (8) with small Value lengths are located at a position of the first row and the first column and a position at the first row and the second column, respectively, in FIG. 16A. That is, according to the example illustrated in FIG. 16A, the priority of the Key will be larger with a high probability when the length of the Value is less. By considering the length of the Value to determine the priority of the Key, it makes it possible to prioritize the eviction of a Values with large lengths or the deletion or eviction of KV pairs of the Values with large lengths when it should evict Values or delete or evict KV pairs according to the priorities, thus releasing more storage space to store more data.

Further, assuming that in the examples shown in FIGS. 15A, 15B, 16A, 16B, 16C and 16D, a Value with the largest length is Key (9), in both FIGS. 15A and 15B, a KV pair of Key (9) is located in a host memory. However, in an example as shown in FIG. 16A, when the length of a Value corresponding to Key (9) is greater than or equal to the first threshold, the Value corresponding to the Value corresponding to Key (9) is stored directly in a CXL memory, which may save a storage space in the host memory of the Redis database, so that the host memory stores complete KV pairs as many as possible by storing more Values with small lengths, to improve a data access hit rate.

In addition, when the usage of the host memory of the Redis database reaches a level, an eviction queue may be used to evict a KV pair of which a Key is in a lower priority, from the host memory in an ascending order of the priorities of the Keys as shown in FIG. 18A, and eviction of four KV pairs in a dashed box in FIG. 15A from the host memory is prioritized as shown in FIG. 15A, thereby obtaining a case shown in FIG. 15B.

In another example, the KV pairs may be evicted more rationally with a level-1 eviction queue and a level-2 eviction queue as shown in FIG. 18B. As shown in FIG. 18B, when the usage of the host memory of the Redis database is greater than the second threshold, the level-1 eviction queue in FIG. 18B may be utilized to evict corresponding Values in the host memory to the CXL memory in the ascending order of the priorities of the Keys (as shown by a dashed arrow). For example, as shown in the dashed box in FIG. 16A, in the order of ascending order of the priorities of the Keys, Values corresponding to Keys (14), (12), (7), (15), (2), and (13) are evicted from the host memory to the CXL memory, and Keys (14), (12), (7), (15), (2), and (13) are evicted from the level-1 eviction queue to the level-2 eviction queue. As shown in the dashed box in FIG. 16B, if the usage of the host memory of the Redis database is found to still be greater than the second threshold at the next determination, Values corresponding to Keys (11) and (6) are evicted from the host memory to the CXL memory in the ascending order of the priorities of the Keys. That is, FIGS. 16A and 16B illustrate the process of level-1 eviction from the host memory to the CXL memory. As shown in FIG. 18B, when the usage of CXL memory is greater than the third threshold, a level-2 eviction queue in FIG. 18B may be used, some of Values in the CXL memory are evicted to a persistent memory or deleted in the ascending order of the priorities of the Keys (as shown by the dashed straight arrow), and the corresponding Keys in a Key space in the host memory are evicted to the persistent memory or deleted (as shown by solid straight arrows). As shown by the dashed box in FIG. 16C, Keys (9), (14) and (12) are evicted from the host memory to the persistent memory or deleted in the ascending order of the priorities of the Keys, and the Values corresponding to Keys (9), (14) and (12) are evicted from the CXL memory to the persistent memory or deleted. As shown in the dashed box in FIG. 16D, if the usage of CXL memory is found to still be greater than the third threshold at the next determination, Keys (7), (15) and (2) are evicted from the host memory to the persistent memory or deleted according to the ascending order of the priorities of the Keys, and Values corresponding to Keys (7), (15) and (2) are evicted from the CXL memory to the persistent memory or deleted.

In addition, when the usage of the host memory of the Redis database is less than the fourth threshold, a Value of at least one KV pair is migrated from the CXL memory to the host memory according to the recorded priorities of the Keys of the KV pairs, so that the usage of the host memory is not less than the fourth threshold, wherein the at least one KV pair is a at least one KV pair of which a Value is written to the CXL memory and of which a Key is in the highest priority order, or the at least one KV pair is a KV pair, of which a Value is written to the CXL memory, of which a length of the Value is less than the first threshold, and which is determined in a descending order of the priorities of the Keys. Specifically, a portion of the Values in the CXL memory is migrated to the host memory according to the descending order of the priorities of the Keys, so that the host memory store more complete KV pairs, to improve the data access hit rate. For example, as shown in the dashed box in FIG. 17A, when the usage of the host memory is less than the fourth threshold and there is a Value in the CXL memory that is less than the first threshold, a Value corresponding to Key (6) is firstly migrated from the CXL memory to the host memory according to the ascending order of the priorities of the Keys as shown in FIG. 17B. If the usage of the host memory is still less than the fourth threshold and there is a Value less than the first threshold in the CXL memory, a Value corresponding to Key (11) is firstly migrated from the CXL memory to the host memory according to the ascending order of the priorities of the Keys as shown in the dashed box in FIG. 17B. In the above examples described with reference to FIGS. 17A and 17B, when migrating Values from the CXL memory to the host memory, only a Value whose length is less than the first threshold is migrated, but the disclosure is not limited thereto, and it is also possible to directly migrate the corresponding Value from the CXL memory to the host memory in the ascending order of the priorities of the Keys without considering the length of the Value.

In addition, prior to, simultaneously with, or after performing above migration, it should migrate Keys (6) and (11) from the level-2 eviction queue to the level-1 eviction queue.

According to one or more embodiments of the disclosure, a system to which a storage device is applied is provided, the system includes a host memory, a CXL memory, and a processor configured to perform the methods for data access as described above. This is described exemplarily below with reference to FIG. 19.

Figure 19:
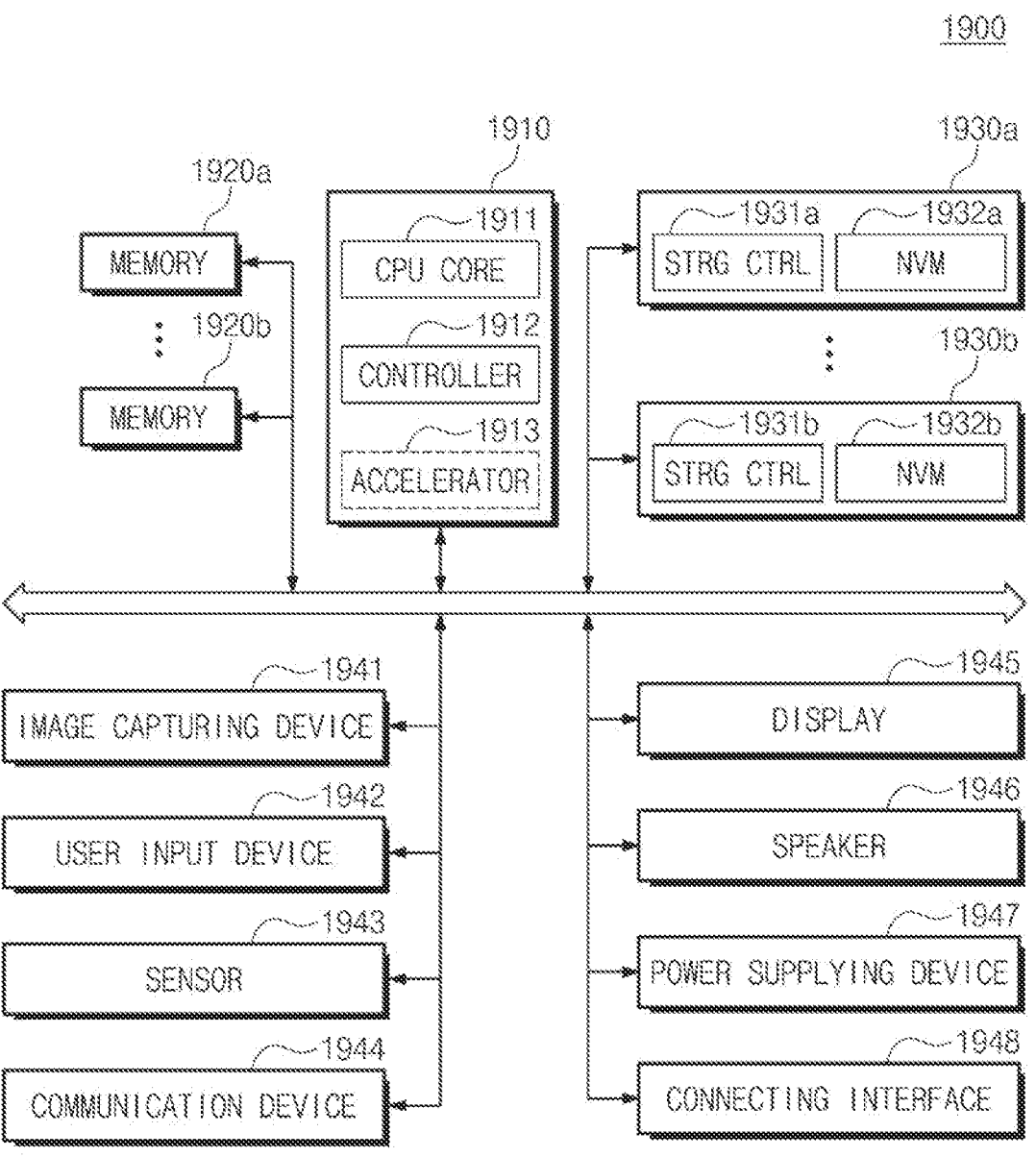
FIG. 19 is a schematic diagram of a system to which a storage device is applied, according to one or more embodiments.

FIG. 19 is a schematic diagram of a system 1900 to which a storage device is applied, according to one or more embodiments.

The system 1900 of FIG. 19 may basically be a mobile system, such as a portable communication terminal (e.g., a mobile phone), a smartphone, a tablet personal computer (PC), a wearable device, a healthcare device, or an Internet of things (IoT) device. However, the system 1900 of FIG. 19 is not necessarily limited to the mobile system and may be a PC, a laptop computer, a server, a media player, or an automotive device (e.g., a navigation device).

Referring to FIG. 19, the system 1900 may include a main processor 1910, memories (e.g., 1920*a* and 1920*b*), and storage devices (e.g., 1930*a* and 1930*b*). In addition, the system 1900 may include at least one of an image capturing device 1941, a user input device 1942, a sensor 1943, a communication device 1944, a display 1945, a speaker 1946, a power supplying device 1947, and a connecting interface 1948.

The main processor 1910 may control all operations of the system 1900, more specifically, operations of other components included in the system 1900. The main processor 1910 may be implemented as a general-purpose processor, a dedicated processor, or an application processor.

The main processor 1910 may include at least one Central Processing Unit (CPU) core 1911 and further include a controller 1912 configured to control the memories 1920*a* and 1920*b* and/or the storage devices 1930*a* and 1930*b*. In some embodiments, the main processor 1910 may further include an accelerator 1913, which is a dedicated circuit for a high-speed data operation, such as an artificial intelligence (AI) data operation. The accelerator 1913 may include a graphics processing unit (GPU), a neural processing unit (NPU) and/or a data processing unit (DPU) and be implemented as a chip that is physically separate from the other components of the main processor 1910.

The memories 1920*a* and 1920*b* may be used as main memory devices (or may be referred to as a host memory) of the system 1900. Although each of the memories 1920*a* and 1920*b* may include a volatile memory, such as static random access memory (SRAM) and/or dynamic RAM (DRAM), each of the memories 1920*a* and 1920*b* may include non-volatile memory, such as a flash memory, phase-change RAM (PRAM) and/or resistive RAM (RRAM). The memories 1920*a* and 1920*b* may be implemented in the same package as the main processor 1910.

The storage devices 1930*a* and 1930*b* may serve as non-volatile storage devices configured to store data regardless of whether power is supplied thereto, and have larger storage capacity than the memories 1920*a* and 1920*b*. The storage devices 1930*a* and 1930*b* may respectively include storage controllers (STRG CTRL) 1931*a* and 1931*b* and NVM (Non-Volatile Memory)s 1932*a* and 1932*b* configured to store data via the control of the storage controllers 1931*a* and 1931*b*. Although the NVMs 1932*a* and 1932*b* may include flash memories having a two-dimensional (2D) structure or a three-dimensional (3D) V-NAND structure, the NVMs 1932a and 1932b may include other types of NVMs, such as PRAM and/or RRAM.

The storage devices 1930a and 1930b may be physically separated from the main processor 1910 and included in the system 1900 or implemented in the same package as the main processor 1910. In addition, the storage devices 1930a and 1930b may have types of solid-state devices (SSDs) or memory cards and be removably combined with other components of the system 1900 through an interface, such as the connecting interface 1948 that will be described below. The storage devices 1930a and 1930b may be devices to which a standard protocol, such as a universal flash storage (UFS), CXL, an embedded multi-media card (eMMC), or a non-volatile memory express (NVMe), is applied, without being limited thereto.

The connecting interface 1948 may provide connection between the system 1900 and an external device, which is connected to the system 1900 and capable of transmitting and receiving data to and from the system 1900. The connecting interface 1948 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), CXL interface, NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to one or more embodiments of the disclosure, a host storage system is provided, the host storage system may include: a storage device including a Computing Express Link (CXL) memory; and a host including a host memory and a host controller, wherein the host controller is configured to perform the methods for data access as described above. This is described exemplarily below with reference to FIG. 20.

FIG. 20 is a block diagram of a host storage system 2000 according to one or more embodiments.

The host storage system 2000 may include a host 2100 and a storage device 2200. Further, the storage device 2200 may include a storage controller (STRG CTRL) 2210 and an NVM 2220. According to one or more embodiments of the disclosure, the host 2100 may include a host controller 2110 and a host memory 2120 (for example, the host controller and the host memory mentioned above). For example, the host memory 2120 may serve as a buffer memory configured to temporarily store data to be transmitted to the storage device 2200 or data received from the storage device 2200.

The storage device 2200 may include storage media configured to store data in response to requests from the host 2100. As an example, the storage device 2200 may include at least one of an SSD, an embedded memory, and a removable external memory. When the storage device 2200 is an SSD, the storage device 2200 may be a device that conforms to an NVMe standard. When the storage device 2200 is an embedded memory or an external memory, the storage device 2200 may be a device that conforms to a UFS standard, an eMMC standard, or CXL standard, and so on. Each of the host 2100 and the storage device 2200 may generate a packet according to an adopted standard protocol and transmit the packet.

When the NVM 2220 of the storage device 2200 includes a flash memory, the flash memory may include a 2D NAND memory array or a 3D (or vertical) NAND (VNAND) memory array. As another example, the storage device 2200 may include various other kinds of NVMs. For example, the storage device 2200 may include magnetic RAM (MRAM), spin-transfer torque MRAM, conductive bridging RAM (CBRAM), ferroelectric RAM (FRAM), PRAM, RRAM, and various other kinds of memories.

According to one or more embodiments, the host controller 2110 and the host memory 2120 may be implemented as separate semiconductor chips. Alternatively, in some embodiments, the host controller 2110 and the host memory 2120 may be integrated in the same semiconductor chip. As an example, the host controller 2110 may be any one of a plurality of modules included in an application processor (AP). The AP may be implemented as a System on Chip (SoC). Further, the host memory 2120 may be an embedded memory included in the AP or memory module located outside the AP.

The host controller 2110 may manage an operation of storing data (e.g., write data) of a buffer region of the host memory 2120 in the NVM 2220 or an operation of storing data (e.g., read data) of the NVM 2220 in the buffer region.

The storage controller 2210 may include a host interface 2211, a memory interface 2212, and a CPU 2213. Further, the storage controllers 2210 may further include a flash translation layer (FTL) 2214, a packet manager 2215, a buffer memory 2216, an error correction code (ECC) engine 2217, and an advanced encryption standard (AES) engine 2218. The storage controllers 2210 may further include a working memory in which the FTL 2214 is loaded. The CPU 2213 may execute the FTL 2214 to control data write and read operations on the NVM 2220.

The host interface 2211 may transmit and receive packets to and from the host 2100. A packet transmitted from the host 2100 to the host interface 2211 may include a command or data to be written to the NVM 2220, and so on. A packet transmitted from the host interface 2211 to the host 2100 may include a response to the command or data read from the NVM 2220, and so on. The memory interface 2212 may transmit data to be written to the NVM 2220 to the NVM 2220 or receive data read from the NVM 2220. The memory interface 2212 may be configured to comply with a standard protocol, such as Toggle or open NAND flash interface (ONFI).

The FTL 2214 may perform various functions, such as an address mapping operation, a wear-leveling operation, and a garbage collection operation. The address mapping operation may be an operation of converting a logical address received from the host 2100 into a physical address used to actually store data in the NVM 2220. The wear-leveling operation may be a technique for preventing excessive deterioration of a specific block by allowing blocks of the NVM 2220 to be uniformly used. As an example, the wear-leveling operation may be implemented using a firmware technique that balances erase counts of physical blocks. The garbage collection operation may be a technique for ensuring usable capacity in the NVM 2220 by erasing an existing block after copying valid data of the existing block to a new block.

The packet manager 2215 may generate a packet according to a protocol of an interface, which consents to the host 2100, or parse various types of information from the packet received from the host 2100. In addition, the buffer memory 2216 may temporarily store data to be written to the NVM 2220 or data to be read from the NVM 2220. Although the buffer memory 2216 may be a component included in the storage controllers 2210, the buffer memory 2216 may be outside the storage controllers 2210.

The ECC engine 2217 may perform error detection and correction operations on read data read from the NVM 2220.

More specifically, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform at least one of an encryption operation and a decryption operation on data input to the storage controllers 2210 by using a symmetric-key algorithm.

According to one or more embodiments of the disclosure, a storage system is provided, the storage system includes: a storage server including a Computing Express Link (CXL) memory; and an application server including a host memory and a processor, wherein the processor is configured to perform the methods for data access as described above. This is described exemplarily below with reference to FIG. 21.

Figure 21:
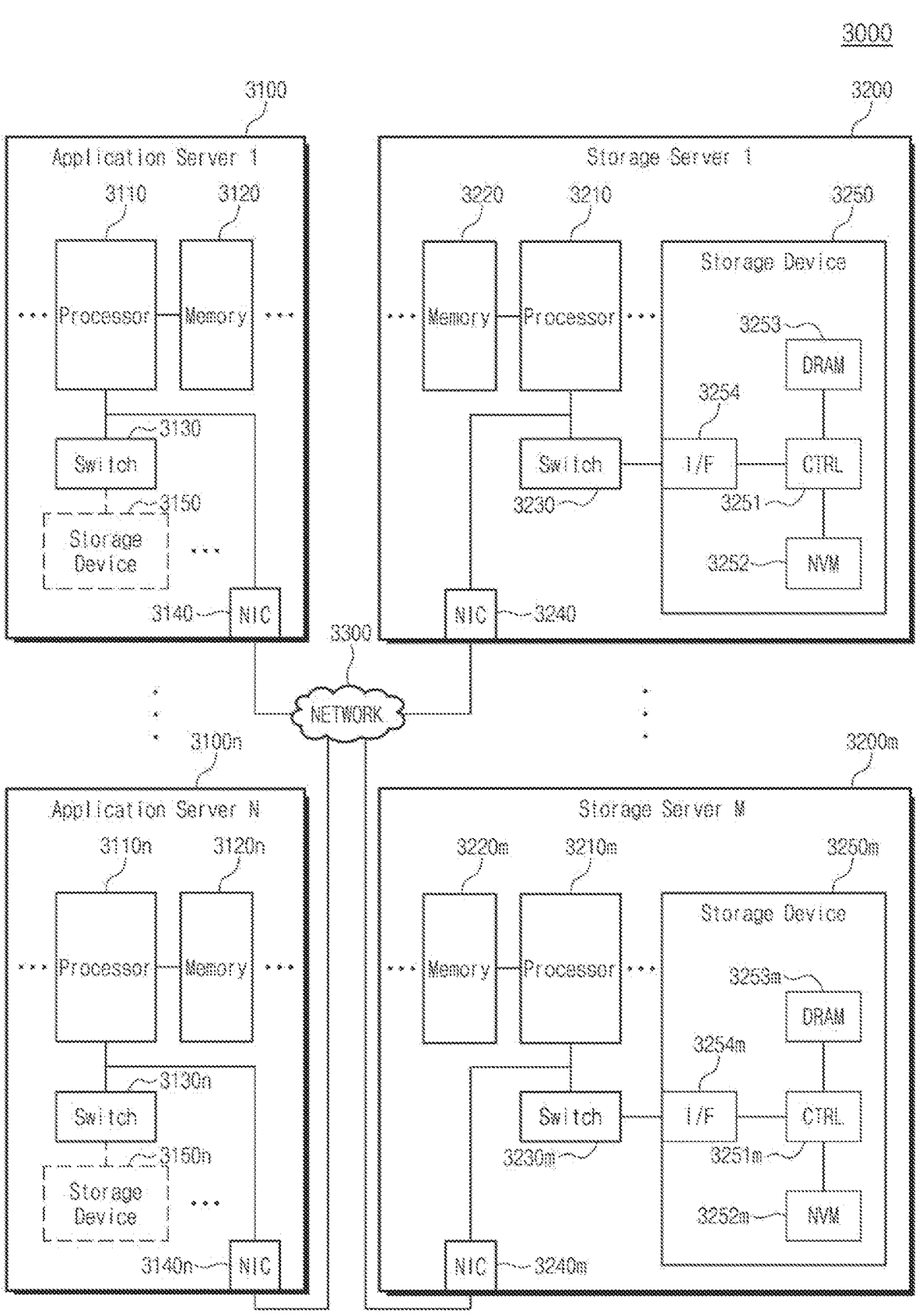
FIG. 21 is a diagram of a data center to which a storage device is applied, according to one or more embodiments of the disclosure.

FIG. 21 is a diagram of a data center 3000 to which a storage device is applied (that is, the storage system as described above), according to one or more embodiments of the disclosure.

Referring to FIG. 21, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220 (for example, the host memory as described above). The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, or a non-volatile DIMM (NVMDIMM). In some embodiments, the numbers of processors 3210 and memories 3220 included in the storage server 3200 may be variously selected. In one or more embodiments, the processor 3210 and the memory 3220 may provide a processor-memory pair. In one or more embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250 (for example, the CXL memory). The number of storage devices 3250 included in the storage server 3200 may be variously selected according to embodiments.

The application servers 3100 to 3100n may communicate with the storage servers 3200 to 3200m through a network 3300.

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, a CF card interface, and/or a CXL interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In one or more embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

Further, according to one or more embodiments of the disclosure, an electronic apparatus may also be provided, which including: at least one processor; and at least one memory storing computer executable instructions, wherein the computer executable instructions, when being executed by the at least one processor, cause the at least one processor to perform the method for data access as described above.

As an example, the electronic apparatus may be a PC computer, a tablet device, a personal digital assistant, a smartphone, or other devices capable of executing the above set of instructions (for example, any electronic device that may connect to a wireless LAN). Herein, the electronic apparatus does not have to be a single electronic apparatus, but may also be an assembly of any device or circuit that is capable to execute the above instructions (or instruction sets) individually or jointly. The electronic apparatus may also be a part of an integrated control system or system manager, or may be configured as a portable electronic apparatus that is interfaced with a local or remote (e.g., via wireless transmission).

In the electronic apparatus, the processor may include a central processing unit (CPU), a graphics processing unit (GPU), a programmable logic device, a specialized processor system, a microcontroller, or a microprocessor. By way of example, the processor may also include an analog processor, a digital processor, a microprocessor, a multicore processor, a processor array, a network processor, and the like.

The processor may execute the instructions or codes stored in the memory, wherein the memory may also store data. The instructions and data may also be transmitted and received through a network via a network interface device, wherein the network interface device may adopt any known transmission protocol.

The memory may be integrated with the processor, for example, by placing a RAM or flash memory within an integrated circuit microprocessor, etc. In addition, the memory may include an independent device, such as, an external disk driver, a storage array, or other storage devices that may be used by any database system. The memory and processor may be coupled operationally, or they may communicate with each other, such as through an I/O port, a network connection, etc., so that the processor is capable of reading a file stored in the memory.

In addition, the electronic apparatus may also include a video display (such as, a LCD display) and a user interaction interface (such as, a keyboard, mouse, touch input device, etc.). All components of the electronic apparatus may be connected to each other through a bus and/or network.

According to one or more embodiments of the present disclosure, a computer-readable storage medium storing instructions may be also provided, wherein the instructions, when being executed by at least one processor, cause the at least one processor to perform the methods for data access according to the embodiments of the present disclosure. An example of the computer-readable storage medium here includes: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer programs and any associated data, data files and data structures in a non-transitory manner, and provide the computer programs and any associated data, data files and data structures to a processor or computer so that the processor or computer can execute the computer programs. The instructions or computer programs in the above-mentioned computer readable-storage medium can be executed in an environment deployed in a computer apparatus such as a client, a host, a proxy device, a server, etc., in addition, in one example, the computer programs and any associated data, data files and data structures are distributed over networked computer systems so that the computer programs and any associated data, data files and data structures are stored, accessed and executed in a distributed manner by one or more processors or computers.

While certain example embodiments the disclosure have been particularly shown and described, it will be understood that various changes in form and details may be made therein without departing from the spirit and scope of the following claims.

What is claimed is:

1. A method for data access to a memory database, the method comprising:
   writing a key of a first key-value pair to a host memory, in response to a write request to write the first key-value pair to the memory database;
   determining whether to write a value of the first key-value pair to the host memory or a Computing Express Link (CXL) memory device, based on a comparison between a length of the value of the first key-value pair and a threshold; and
   writing the value of the first key-value pair to the host memory or the CXL memory device, based on a result of the determining.

2. The method according to claim 1, wherein the determining whether to write the value of the first key-value pair to the host memory or the CXL memory device comprises:

based on the length of the value being greater than or equal to a first threshold, determining to write the value to the CXL memory device; and based on the length of the value being less than the first threshold, determining to write the value to the host memory.

3. The method according to claim 2, further comprising:

updating and recording a priority of the key of the first key-value pair.

4. The method according to claim 3, further comprising:

determining whether a usage of the host memory is greater than a second threshold;

based on the usage of the host memory being greater than the second threshold, evicting a value of at least one second key-value pair to the CXL memory device based on recorded priorities of keys of key-value pairs so that the usage of the host memory is not greater than the second threshold, wherein a key of the at least one second key-value pair is a lowest priority order among the key-value pairs written in the host memory;

determining whether a usage of the CXL memory device is greater than a third threshold; and based on the usage of the CXL memory device being greater than the third threshold, evicting a key and a value of at least one third key-value pair from the host memory and the CXL memory device, respectively, to a persistent memory based on the recorded priorities of the keys of the key-value pairs so that the usage of the CXL memory device is not greater than the third threshold, wherein the key of the at least one third key-value pair is in the lowest priority order in the CXL memory device.

5. The method according to claim 4, further comprising:

determining whether the usage of the host memory is less than a fourth threshold which is less than the second threshold; and based on the usage of the host memory being less than the fourth threshold, migrating a value of at least one fourth key-value pair from the CXL memory device to the host memory based on the recorded priorities of the keys of the key-value pairs so that the usage of the host memory is not less than the fourth threshold, wherein the value of the at least one fourth key-value pair is written to the CXL memory device, and the key of the at least one fourth key-value pair is in a highest priority order.

6. The method according to claim 1, further comprising, based on a read request to read a sixth key-value pair:

based on a key of the sixth key-value pair not being hit in the host memory, reading the sixth key-value pair from a persistent memory;

based on the key of the sixth key-value pair being hit in the host memory and a value of the sixth key-value pair being written to the host memory, reading the sixth key-value pair from the host memory; and based on the key of the sixth key-value pair being hit in the host memory and the value of the sixth key-value pair not being written to the host memory, reading the value of the sixth key-value pair from the CXL memory device based on the key of the sixth key-value pair.

7. The method according to claim 3, wherein the updating and recording the priority of the key of the first key-value pair comprises:

updating and recording the priority of the key of the first key-value pair based on a access frequency value of the key of the first key-value pair and the length of the value of the first key-value pair.

8. A device for data access to a memory database, the device comprising:

a data writing unit configured to:

write a key of a first key-value pair to a host memory, in response to a write request to write the first key-value pair to the memory database, determine whether to write a value of the first key-value pair to the host memory or a Computing Express Link (CXL) memory device, based on a comparison between a length of the value of the first key-value pair and a threshold, and write the value of the first key-value pair to the host memory or the CXL memory device based on a result of the determination.

9. The device according to claim 8, wherein the data writing unit is configured to determine whether to write the value of the first key-value pair to the host memory or the CXL memory device by:

based on the length of the value being greater than or equal to a first threshold, determining to write the value to the CXL memory device; and based on the length of the value being less than the first threshold, determining to write the value to the host memory.

10. The device according to claim 9, further comprising:

an update unit configured to update and record a priority of the key of the first key-value pair.

11. The device according to claim 10, wherein the data writing unit is further configured to:

determine whether a usage of the host memory is greater than a second threshold;

based on the usage of the host memory being greater than the second threshold, evict a value of at least one second key-value pair to the CXL memory device based on recorded priorities of keys of key-value pairs so that the usage of the host memory is not greater than the second threshold, wherein a key of the at least one second key-value pair is in a lowest priority order among the key-value pairs written in the host memory;

determine whether a usage of the CXL memory device is greater than a third threshold; and based in the usage of the CXL memory device being greater than the third threshold, evict a key and a value of at least one third key-value pair from the host memory and the CXL memory device, respectively, to a persistent memory based on the recorded priorities of the keys of the key-value pairs so that the usage of the CXL memory device is not greater than the third threshold, wherein the key of the at least one third key-value pair is in the lowest priority order.

12. The device according to claim 11, wherein the data writing unit is further configured to:

determine whether the usage of the host memory is less than a fourth threshold which is less than the second threshold; and based on the usage of the host memory being less than the fourth threshold, migrate a value of at least one fourth key-value pair from the CXL memory device to the host memory based on the recorded priorities of the keys of the key-value pairs so that the usage of the host memory is not less than the fourth threshold, wherein the value of the at least one fourth key-value pair is written to the CXL memory device, and a key of the at least one fourth key-value pair is in a highest priority order.

13. The device according to claim 10, further comprising:

a data reading unit configured to, in response to a read request to read a sixth key-value pair:

based on a key of the sixth key-value pair not being hit in the host memory, read the sixth key-value pair from a persistent memory;

based on the key of the sixth key-value pair being hit in the host memory and the value of the sixth key-value pair being written to the host memory, read the sixth key-value pair from the host memory; and based on the key of the sixth key-value pair being hit in the host memory and the value of the sixth key-value pair is not written to the host memory, read the value of the sixth key-value pair from the CXL memory device based on the key of the sixth key-value pair.

14. The device according to claim 10, wherein the update unit is configured to update and record the priority of the key of the first key-value pair by:

updating and recording the priority of the key of the first key-value pair based on an access frequency value of the key of the first key-value pair and the length of the value of the first key-value pair.

15. An electronic apparatus comprising:

at least one processor; and at least one memory storing computer executable instructions, wherein the at least one processor is configured to execute the computer executable instructions to:

write a key of a first key-value pair to a host memory, in response to a write request to write the first key-value pair to a memory database;

determine whether to write a value of the first key-value pair to the host memory or a Computing Express Link (CXL) memory device, based on a comparison between a length of the value of the first key-value pair and a threshold; and write the value of the first key-value pair to the host memory or the CXL memory device, based on a result of the determination.

16. A non-transitory computer-readable storage medium storing instructions, wherein the instructions are executable by at least one processor to cause the at least one processor to perform the method according to claim 1.

17. A system to which a storage device is applied, the system comprising:

the host memory;

the CXL memory device; and at least one processor configured to perform the method according to claim 1.

18. A host storage system comprising:

a storage device comprising the CXL memory device; and a host comprising the host memory and a host controller, wherein the host controller is configured to perform the method according to claim 1.

19. A storage system comprising:

a storage server comprising the CXL memory device; and an application server comprising the host memory and at least one processor, wherein the at least one processor is configured to perform the method according to claim 1.

20. The method of claim 4, further comprising:

determining whether the usage of the host memory is less than a fourth threshold which is less than the second threshold; and based on the usage of the host memory being less than the fourth threshold, migrating a value of at least one fifth key-value pair from the CXL memory device to the host memory based on the recorded priorities of the keys of the key-value pairs so that the usage of the host memory is not less than the fourth threshold, the value of the at least one fifth key-value pair being written to the CXL memory device and having the length less than the first threshold, the at least one fifth key-value pair being determined in a descending order of the recorded priorities of the keys.

* * * * *